US011465613B2

United States Patent
Umino et al.

(10) Patent No.: US 11,465,613 B2
(45) Date of Patent: Oct. 11, 2022

(54) PARKING ASSISTANCE DEVICE AND CONTROL METHOD OF PARKING ASSISTANCE DEVICE

(71) Applicant: CLARION CO., LTD., Saitama (JP)

(72) Inventors: Ryosuke Umino, Saitama (JP); Toshihisa Kuwahara, Saitama (JP); Takehito Ogata, Tokyo (JP); Shuzo Kaneko, Saitama (JP)

(73) Assignee: CLARION CO., LTD., Saitama (JP)

( * ) Notice: Subject to any disclaimer, the term of this patent is extended or adjusted under 35 U.S.C. 154(b) by 264 days.

(21) Appl. No.: 16/912,765

(22) Filed: Jun. 26, 2020

(65) Prior Publication Data
US 2021/0031755 A1    Feb. 4, 2021

(30) Foreign Application Priority Data
Jul. 29, 2019   (JP) .............................. JP2019-138541

(51) Int. Cl.
*B60W 30/06* (2006.01)

(52) U.S. Cl.
CPC ......... *B60W 30/06* (2013.01); *B60W 2420/42* (2013.01); *B60W 2420/54* (2013.01);
(Continued)

(58) Field of Classification Search
CPC ......... B60W 30/06; B60W 2554/4044; B60W 2554/802; B60W 2554/801; B60W 2420/42; B60W 2420/54
See application file for complete search history.

(56) References Cited

U.S. PATENT DOCUMENTS 9,796,381 B2 *  10/2017  Jung .................... B60W 30/06
2006/0287825 A1 * 12/2006  Shimizu ................ B60Q 9/005
                                                701/516
(Continued)

FOREIGN PATENT DOCUMENTS

CN      101375180 A   *  2/2009  ........... G01S 15/878
CN      108473131 A   *  8/2018  ............. B60R 21/00
(Continued)

OTHER PUBLICATIONS

Extended European Search Report mailed by European Patent Office dated Dec. 4, 2020 in corresponding European patent application No. 20187762.8-1009.

*Primary Examiner* — Peter D Nolan
*Assistant Examiner* — Kenneth M Dunne
(74) *Attorney, Agent, or Firm* — IP Business Solutions, LLC

(57) ABSTRACT

A parking assistance device includes a parking direction specification unit specifying a parking direction in a case where a subject vehicle is parked at a parking region, an obstacle detection unit detecting an obstacle, a detection range setting unit setting a detection range for detecting a bearing of the obstacle, a division unit dividing the detection range in a direction associated with the specified parking direction and generating plural divided ranges, a bearing calculation unit calculating a bearing of the detected obstacle, which is a bearing of a side surface of the obstacle which extends in the parking direction, for each of the divided ranges and calculating an average value of the bearings which are respectively calculated for the divided ranges, and a parking position setting unit setting a parking position where the subject vehicle is parked at the parking region based on the calculated average value.

8 Claims, 14 Drawing Sheets

(52) U.S. Cl.
CPC ............ *B60W 2554/4044* (2020.02); *B60W 2554/801* (2020.02); *B60W 2554/802* (2020.02)

(56) References Cited

U.S. PATENT DOCUMENTS

| | | | | |
|---|---|---|---|---|
| 2007/0146165 | A1* | 6/2007 | Tanaka | B62D 15/0285 |
| | | | | 348/148 |
| 2016/0075327 | A1* | 3/2016 | Kiyokawa | B62D 15/0285 |
| | | | | 701/301 |
| 2016/0075377 | A1* | 3/2016 | Tomozawa | B62D 15/028 |
| | | | | 701/41 |
| 2017/0028984 | A1* | 2/2017 | Kiyokawa | G01S 15/931 |
| 2018/0099661 | A1* | 4/2018 | Bae | B62D 15/0285 |
| 2018/0180731 | A1 | 6/2018 | Inoue et al. | |
| 2020/0003565 | A1* | 1/2020 | Cunha | G08G 1/143 |
| 2020/0074192 | A1* | 3/2020 | Ogata | G06V 10/44 |

FOREIGN PATENT DOCUMENTS

| | | | | |
|---|---|---|---|---|
| DE | 102006061390 | A1 * | 7/2008 | ............ B60W 40/02 |
| DE | 102013103569 | A1 * | 10/2013 | ......... B62D 15/0285 |
| EP | 3453595 | A1 * | 3/2019 | ......... B62D 15/0285 |
| JP | 2006-193011 | A | 7/2006 | |
| JP | 2013-220745 | A | 10/2013 | |

\* cited by examiner

PARKING ASSISTANCE DEVICE AND CONTROL METHOD OF PARKING ASSISTANCE DEVICE

INCORPORATION BY REFERENCE

The present application claims priority under 35 U.S.C. § 119 to Japanese Patent Application No. 2019-138541 filed on Jul. 29, 2019. The content of the application is incorporated herein by reference in its entirety.

BACKGROUND OF THE INVENTION

Field of the Invention

The present invention relates to a parking assistance device and a control method of a parking assistance device.

Description of the Related Art

In recent years, studies and development of parking assistance devices that assist parking of a vehicle at a parking position have been actively made. In such parking assistance devices, a parking assistance device has been known which automatically decides a direction of a vehicle in parking the vehicle in the parking position. For example, a parking assistance device in Japanese Patent Laid-open No. 2006-193011 includes means of deciding a target parking position, means of detecting an obstacle present around the target parking position, and means of estimating a direction of each obstacle present on both sides of the target parking position based on detection information of an obstacle, decides a target parking direction as a direction of a vehicle in the target parking position based on estimated directions of both obstacles, and assists vehicle travel to the target parking position such that the target parking direction is realized.

SUMMARY OF THE INVENTION

However, in a case where obstacles such as another vehicle and a curb are present around a parking region, it is demanded that a vehicle be stopped in a preferable bearing that corresponds to those obstacles. A parking assistance device disclosed in Japanese Patent Laid-open No. 2006-193011 includes means of estimating a direction of an obstacle but may not park the vehicle in a preferable bearing that corresponds to the direction of the obstacle in a case where precision of estimation of the direction of the obstacle is low.

One aspect of the present invention has been made in consideration of the above circumstance, and an object is to park a vehicle in a preferable bearing that corresponds to an obstacle present around a parking region.

To achieve the above object, a parking assistance device of one aspect of the present invention includes: a parking region detection unit configured to detect a parking region at which a vehicle on which the parking assistance device is mounted is capable of being parked; a parking direction specification unit configured to specify a parking direction in a case where the vehicle is parked at the parking region; an obstacle detection unit configured to detect an obstacle present around the vehicle; a detection range setting unit configured to set a region which includes the parking region and a region which neighbors the parking region, as a detection range for detecting a bearing of the obstacle; a division unit configured to divide the detection range in a direction which is associated with the parking direction specified by the parking direction specification unit and generates plural divided ranges; a bearing calculation unit configured to calculate a bearing of the obstacle detected by the obstacle detection unit, which is a bearing of a side surface of the obstacle which extends in the parking direction, for each of the divided ranges and calculates an average value of the bearings of the obstacle which are respectively calculated for the divided ranges; and a parking position setting unit configured to set a parking position in a case where the vehicle is parked at the parking region, based on the average value of the bearings which is calculated by the bearing calculation unit.

The parking assistance device may be configured such that the detection range includes a first detection range that includes the parking region and a second detection range and a third detection range that neighbor the first detection range, the division unit divides each of the first detection range, the second detection range, and the third detection range into plural portions and generates the divided ranges, the bearing calculation unit calculates an average value of bearings of the obstacle for each of the detection ranges, which are the first detection range, the second detection range, and the third detection range, and outputs the average value of the bearings of the obstacle in the first detection range in a case where the bearings of the obstacle are calculated in the divided ranges resulting from division of the first detection range.

The parking assistance device may be configured such that in a case where the bearings of the obstacle are not calculated in the divided ranges resulting from division of the first detection range, the bearing calculation unit respectively calculates the average value of the bearings of the obstacle, which are calculated in the divided ranges resulting from division of the second detection range, and the average value of the bearings of the obstacle, which are calculated in the divided ranges resulting from division of the third detection range, and outputs an average value of the calculated average value of the bearings of the obstacle in the second detection range and the calculated average value of the bearings of the obstacle in the third detection range.

The parking assistance device may be configured to further include a tentative parking space setting unit configured to set a tentative parking space for parking the vehicle in the parking region and may be configured such that the bearing calculation unit obtains a bearing of the tentative parking space set by the tentative parking space setting unit, excludes the bearings, whose differences from the bearing of the tentative parking space are a threshold value set in advance or greater, from the bearings of the obstacle that are respectively calculated for the divided ranges, and calculates the bearing of the obstacle for each of the detection ranges, which are the first detection range, the second detection range, and the third detection range.

The parking assistance device may be configured such that the division unit divides the detection range in a direction orthogonal to a front-rear axis direction of the vehicle as the direction associated with the parking direction in a case where the parking direction specified by the parking direction specification unit is a direction in parallel with the front-rear axis direction of the vehicle and divides the detection range in a direction orthogonal to a width direction of the vehicle as the direction associated with the parking direction in a case where the parking direction specified by the parking direction specification unit is a direction in parallel with the width direction of the vehicle.

To achieve the above object, a control method of a parking assistance device of one aspect of the present invention includes: a parking region detection step of detecting a parking region at which a vehicle on which the parking assistance device is mounted is capable of being parked; a parking direction specification step of specifying a parking direction in a case where the vehicle is parked at the parking region; an obstacle detection step of detecting an obstacle present around the vehicle; a detection range setting step of setting a region that includes the parking region and a region which neighbors the parking region, as a detection range for detecting a bearing of the obstacle; a division step of dividing the detection range in a direction which is associated with the parking direction specified by the parking direction specification step and generating plural divided ranges; a bearing calculation step of calculating a bearing of the obstacle detected by the obstacle detection step, which is a bearing of a side surface of the obstacle which extends in the parking direction, for each of the divided ranges and calculating an average value of the bearings of the obstacle which are respectively calculated for the divided ranges; and a parking position setting step of setting a parking position in a case where the vehicle is parked at the parking region based on the average value of the bearings which is calculated by the bearing calculation step.

The control method of a parking assistance device may be configured such that the detection range includes a first detection range that includes the parking region and a second detection range and a third detection range that neighbor the first detection range, in the division step, each of the first detection range, the second detection range, and the third detection range is divided into plural portions, and the divided ranges are generated, in the bearing calculation step, an average value of bearings of the obstacle is calculated for each of the detection ranges, which are the first detection range, the second detection range, and the third detection range, and the average value of the bearings of the obstacle in the first detection range is output in a case where the bearings of the obstacle are calculated in the divided ranges resulting from division of the first detection range.

The control method of a parking assistance device may be configured such that in the bearing calculation step, in a case where the bearings of the obstacle are not calculated in the divided ranges resulting from division of the first detection range, the average value of the bearings of the obstacle, which are calculated in the divided ranges resulting from division of the second detection range, and the average value of the bearings of the obstacle, which are calculated in the divided ranges resulting from division of the third detection range are respectively calculated, and an average value of the calculated average value of the bearings of the obstacle in the second detection range and the calculated average value of the bearings of the obstacle in the third detection range is output.

The control method of a parking assistance device may be configured to further include a tentative parking space setting step of setting a tentative parking space for parking the vehicle in the parking region and may be configured such that in the bearing calculation step, a bearing of the tentative parking space set by the tentative parking space setting step is obtained, the bearings, whose differences from the bearing of the tentative parking space are a threshold value set in advance or greater, are excluded from the bearings of the obstacle that are respectively calculated for the divided ranges, and the bearing of the obstacle is calculated for each of the detection ranges, which are the first detection range, the second detection range, and the third detection range.

The control method of a parking assistance device may be configured such that in the division step, the detection range is divided in a direction orthogonal to a front-rear axis direction of the vehicle as the direction associated with the parking direction in a case where the parking direction specified by the parking direction specification step is a direction in parallel with the front-rear axis direction of the vehicle and the detection range is divided in a direction orthogonal to a width direction of the vehicle as the direction associated with the parking direction in a case where the parking direction specified by the parking direction specification step is a direction in parallel with the width direction of the vehicle.

In one aspect of the present invention, a vehicle may be parked in a preferable bearing that corresponds to an obstacle present around a parking region.

DETAILED DESCRIPTION OF THE PREFERRED EMBODIMENTS

An embodiment to which the present invention is applied will hereinafter be described with reference to the attached drawings.

Figure 1:
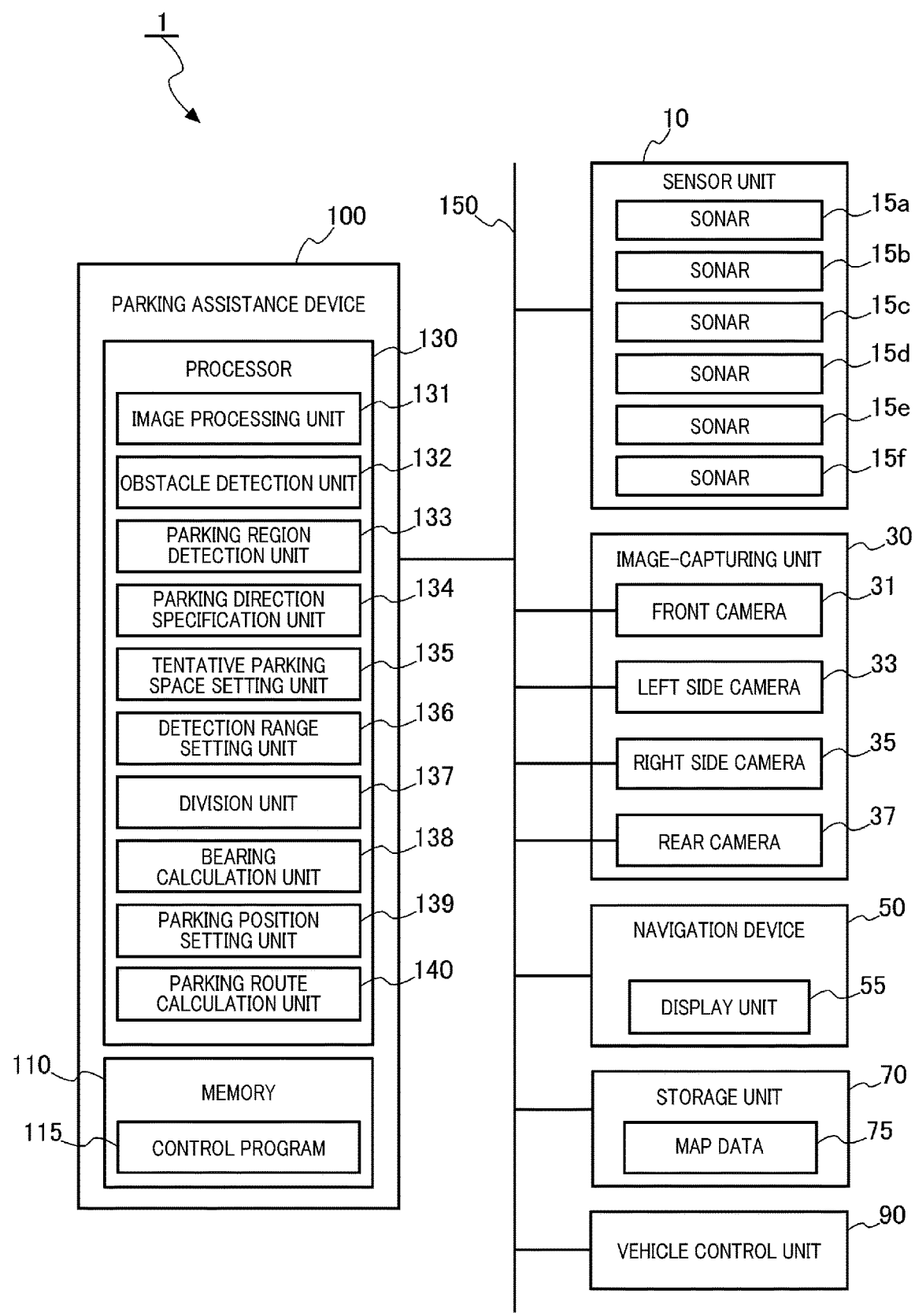
FIG. 1 is a diagram that illustrates a configuration of a parking assistance device.

FIG. 1 is a block diagram that illustrates a configuration of an in-vehicle device 1.

The in-vehicle device 1 is a device that is mounted on a vehicle and controls travel of a vehicle on which the in-vehicle device 1 is mounted. In the following, the vehicle on which the in-vehicle device 1 is mounted will be denoted as subject vehicle 5, and vehicles other than the subject vehicle 5 will be denoted as other vehicles 7 and thereby be distinguished from the subject vehicle 5.

The subject vehicle 5 is a vehicle that travels by a driving operation by a driver and is a vehicle that is capable of being driven by autonomous driving by computer control without the driving operation by the driver. The subject vehicle 5 is a vehicle such as a four-wheeled vehicle driven by an engine, an electrically driven vehicle driven by a motor, or a hybrid vehicle on which a motor and an engine are mounted, for example, and may be a vehicle other than a four-wheeled vehicle.

The in-vehicle device 1 includes a sensor unit 10, an image-capturing unit 30, a navigation device 50, a storage unit 70, a vehicle control unit 90, and a parking assistance device 100. Those units are connected together by a communication bus such as a controller area network (CAN) 150, for example, such that mutual data communication is possible.

Figure 2:
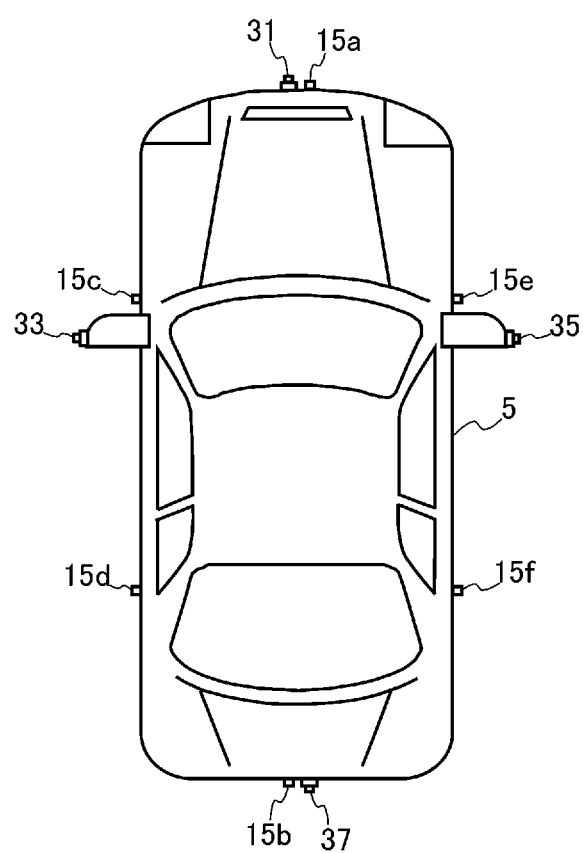
FIG. 2 is a diagram that illustrates mounting positions of a sensor unit and an image-capturing unit.

FIG. 2 is a diagram that illustrates mounting positions of the sensor unit 10 and the image-capturing unit 30 in the subject vehicle 5.

The sensor unit 10 includes plural ultrasonic sonars. In the following, ultrasonic sonar will simply be denoted as sonar. The sensor unit 10 of this embodiment includes six sonars of sonars 15a to 15f.

The sonar 15a is attached to a front bumper or a front grille of the subject vehicle 5, and the sonar 15b is attached to a rear bumper or a rear garnish of the subject vehicle 5. The sonar 15c is attached to a front portion on a left side of the subject vehicle 5, and the sonar 15d is attached to a rear portion on the left side of the subject vehicle 5. The sonar 15e is attached to a front portion on a right side of the subject vehicle 5, and the sonar 15f is attached to a rear portion on the right side of the subject vehicle 5.

Each of the sonars 15a to 15f emits an ultrasonic wave toward a prescribed angle range around the subject vehicle 5. Each of the sonars 15a to 15f detects the distance to an obstacle by using a time difference between emission of the ultrasonic wave and reception of a reflected wave of the ultrasonic wave, which is reflected by the obstacle. Each of the sonars 15a to 15f detects a direction in which the obstacle is present by a reception direction of the reflected wave. Each of the sonars 15a to 15f outputs information that indicates detected distance and bearing of the obstacle (hereinafter referred to as detection information) to the parking assistance device 100. The parking assistance device 100 temporarily stores the input detection information in a memory 110.

The image-capturing unit 30 includes a front camera 31, a left side camera 33, a right side camera 35, and a rear camera 37. Each of the front camera 31, the left side camera 33, the right side camera 35, and the rear camera 37 includes an image sensor such as a charge-coupled device (CCD) or a complementary metal-oxide-semiconductor (CMOS) and a data processing circuit that generates a captured image based on a light reception state of the image sensor. Angles of view of the front camera 31, the left side camera 33, the right side camera 35, and the rear camera 37 are adjusted such that it becomes possible to capture images in a range of 360° around the subject vehicle 5 as a center by those four cameras. Each of the front camera 31, the left side camera 33, the right side camera 35, and the rear camera 37 captures an image in an image-capturing range at a prescribed frame rate and thereby generates a captured image. The image-capturing unit 30 outputs the generated captured image to the parking assistance device 100. The parking assistance device 100 temporarily stores the input captured image in the memory 110.

The front camera 31 is attached to a tip end portion of a front grille or the like, a back surface of a rear view mirror in a vehicle interior, or the like, for example, and captures an image of a front area, which includes a road surface, of the subject vehicle 5 at a prescribed frame rate. The front area of the subject vehicle 5 represents a direction toward a wind shield as seen from the driver seated on a driver seat.

The right side camera 35 is attached to a right side-view mirror, for example, and captures an image of a right section, which includes a road surface, of the subject vehicle 5 at a prescribed frame rate. The left side camera 33 is attached to a left side-view mirror, for example, and captures an image of a left section, which includes a road surface, of the subject vehicle 5 at a prescribed frame rate.

The rear camera 37 is attached to an opening lever of a rear gate, a rear spoiler, or the like, for example, and captures an image of a rear area, which includes a road surface, of the subject vehicle 5 at a prescribed frame rate. The rear area of the subject vehicle 5 represents a direction opposite to the front area of the subject vehicle 5 and toward a rear window as seen from the driver seated on the driver seat.

The number of cameras included in the image-capturing unit 30 and arrangement are examples and may arbitrarily be changed. That is, the number of cameras provided to the subject vehicle 5 may be more or less as long as it is possible to capture images of a range of 360° around the subject vehicle 5 as the center.

The navigation device 50 receives a positioning signal transmitted from a Global Positioning System (GPS) satellite and calculates the latitude and longitude as an absolute position of the subject vehicle 5 based on the received positioning signal. The navigation device 50 includes an operation unit, which is not illustrated, and searches for an optimal guiding route that connects the present position with a destination when an input of the destination is accepted by the operation unit. Further, the navigation device 50 includes a display unit 55 that includes a display and causes the display unit 55 to display the guiding route obtained by the search or guidance display for a riding person.

The storage unit 70 is configured with an auxiliary storage device (memory) such as a hard disk drive (HDD) and a solid state drive (SSD), for example. The storage unit 70 stores map data 75 that is used when the navigation device 50 searches for the guiding route or displays route guidance which includes the guiding route obtained by the search.

The vehicle control unit 90 includes for example, a central processing unit (CPU), a read-only memory (ROM) and a random access memory (RAM), and executes a control program stored in ROM or the like to control travel of the subject vehicle 5. The vehicle control unit 90 controls driving mechanisms such as an engine, steering, a brake, and a transmission and causes the subject vehicle 5 to travel along a route calculated by the parking assistance device 100. Here, the vehicle control unit 90 detects an obstacle based on the detection information by the sensor unit 10 or a captured image by the image-capturing unit 30 and moves the subject vehicle 5 to a parking position as a target position while avoiding collision with the detected obstacle.

The parking assistance device 100 detects a parking region 300 (see FIG. 4) at which the subject vehicle 5 is capable of being parked based on the detection information by the sensor unit 10 or a captured image by the image-capturing unit 30. The parking assistance device 100 sets the parking position of the subject vehicle 5 in the detected parking region 300 and calculates a parking route that reaches the set parking position.

Next, the parking assistance device 100 will be described.

The parking assistance device 100 is configured with an electronic control unit (ECU) as a computer device that includes the memory 110 and a processor 130.

The memory 110 includes a non-volatile storage device and a volatile storage device. The memory 110 may be configured only with a non-volatile storage device. A non-volatile storage device is configured with a read-only memory (ROM) or a flash memory, for example, and a volatile storage device is configured with a random access memory (RAM), for example.

The non-volatile storage device stores a control program 115. The volatile storage device stores the detection information by the sensor unit 10, a captured image generated by the image-capturing unit 30, or the like.

The processor 130 is an arithmetic processing device that is configured with a central processing unit (CPU) or a micro-processing unit (MPU). The processor 130 executes the control program 115 and controls each unit of the in-vehicle device 1. The processor 130 may be configured with a single processor or may be configured with plural processors. The processor 130 may be configured with a system on chip (SoC) that is integrated with a portion or whole of the memory 110 or another circuit. The processor 130 may be configured with a combination of a CPU that executes a program and a digital signal processor (DSP) that executes prescribed arithmetic processing. In addition, all functions of the processor 130 are implemented in hardware or may be configured by using a programmable device.

The parking assistance device 100 includes an image processing unit 131, an obstacle detection unit 132, a parking region detection unit 133, a parking direction specification unit 134, a tentative parking space setting unit 135, a detection range setting unit 136, a division unit 137, a bearing calculation unit 138, a parking position setting unit 139, and a parking route calculation unit 140 as function blocks. Those function blocks denote functions, which are realized by executing command sets described in the control program 115 and performing computation of data and control by the processor 130, by blocks.

The image processing unit 131 reads out captured images from the memory 110. The captured images are images that are captured by the front camera 31, the left side camera 33, the right side camera 35, and the rear camera 37. The image processing unit 131 transforms the coordinates in a coordinate system set for the captured image which is read out into the coordinates in a world coordinate system by a known transformation formula and calculates pixel values at the coordinates of the world coordinate system. The world coordinate system is a coordinate system in which the center of the subject vehicle 5, for example, such as the center of an axle of front wheels or the center of gravity of the vehicle is set as the origin, the front-rear direction of the subject vehicle 5 is set as Y axis, and the left-right direction is set as X axis, for example. An image that is transformed into pixel values at the coordinates of the world coordinate system will be referred to as "transformed image" in the following.

The obstacle detection unit 132 detects an obstacle present around the subject vehicle 5 based on the detection information by the sensor unit 10 or a captured image by the image-capturing unit 30. Obstacles detected by the obstacle detection unit 132 include fixed obstacles such as a curb, a guard rail, a wall, and a fence that are present on a road or the like on which the subject vehicle 5 travels, in addition to the other vehicles 7.

Figure 3:
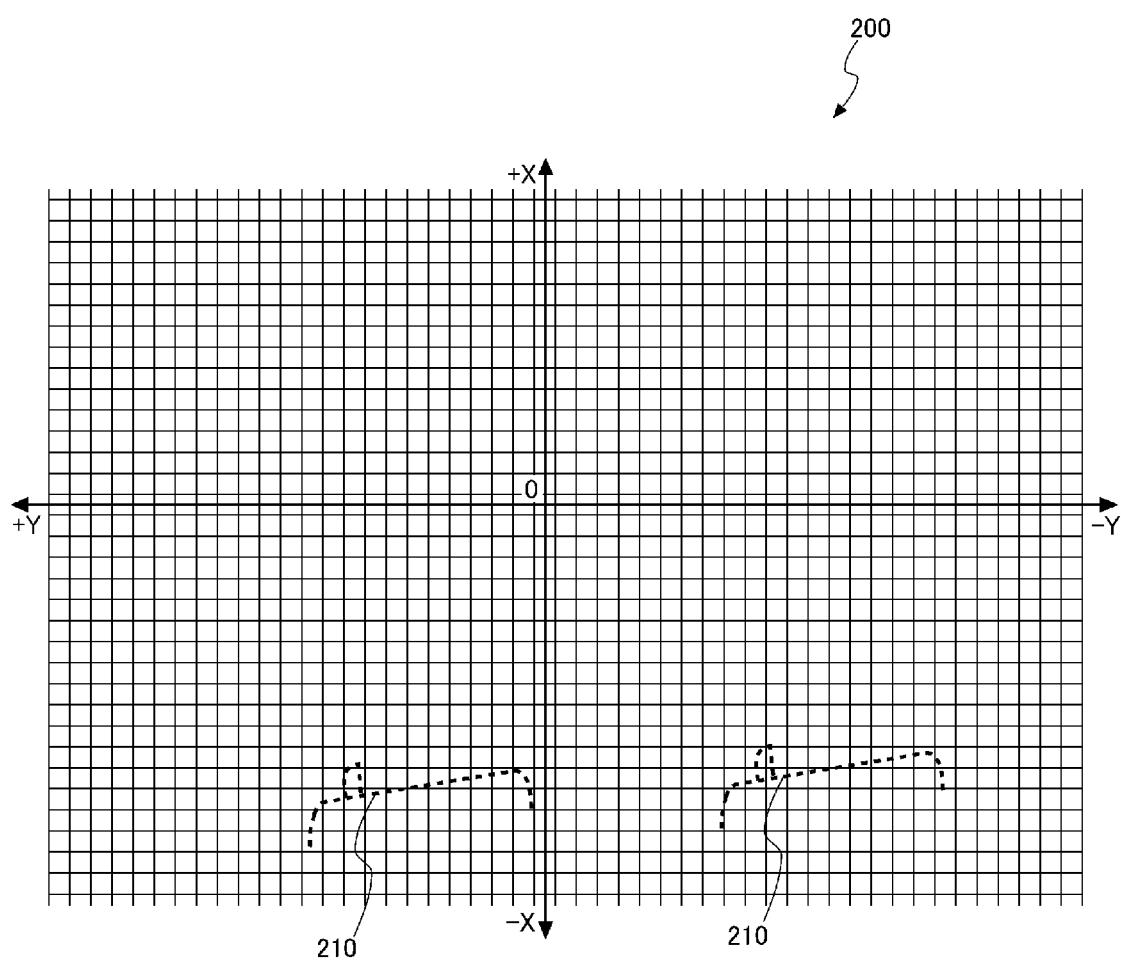
FIG. 3 is a diagram that illustrates one example of a map.

FIG. 3 is a diagram that illustrates one example of a map 200.

The obstacle detection unit 132 records data that indicates the distance or bearing of an obstacle present around the subject vehicle 5 by analyzing the detection information by the sensor unit 10 or the transformed image, on the map 200. The map 200 is generated in a storage region of the volatile storage device included in the memory 110, for example. In the map 200, a coordinate system is set in which the center of the subject vehicle 5, for example, such as the center of the axle of the front wheels or the center of gravity of the vehicle is set as the origin, the front-rear direction of the subject vehicle 5 is set as Y axis, and the left-right direction is set as X axis. That is, the coordinate system of the map 200 corresponds to the world coordinate system.

In a case where an obstacle is detected based on the detection information by the sensor unit 10, the obstacle detection unit 132 records data on the map 200 based on the bearing or distance of the detected obstacle. In a case where an obstacle is detected based on the transformed image, the obstacle detection unit 132 also records data on the map 200 based on the bearing or distance of the detected obstacle. Specifically, the obstacle detection unit 132 records data, which indicates that the obstacle is present, in the position on the map 200 that corresponds to the bearing or distance of the detected obstacle. The map 200 illustrated in FIG. 3 illustrates a state where data 210 are recorded in the positions on the map 200 that correspond to the bearings or distances of the detected obstacles.

The parking region detection unit 133 detects the parking region 300. The parking region 300 is a region that has an expanse in which the subject vehicle 5 is capable of being parked, does not hinder travel of the other vehicle 7 when the subject vehicle 5 is parked, and is not a place in which parking or stopping is prohibited such as a parking-stopping prohibited roadside zone, a pedestrian roadside zone, a parking-stopping prohibited place, or a stopping prohibited place.

The parking region detection unit 133 acquires map data 75 from the navigation device 50. The map data 75 is a map of a prescribed range that includes the latitude and longitude of the present position of the subject vehicle 5 which are calculated by the navigation device 50 based on the positioning signal. The parking region detection unit 133 acquires the map 200 detected by the obstacle detection unit 132.

The parking region detection unit 133 first detects a region, in which an obstacle such as the other vehicle 7 is not present and which does not hinder travel of the other vehicle 7 and has an expanse of a set size which is set in advance or larger, based on the acquired map 200. When the region is detected, the parking region detection unit 133 refers to the map data 75 and determines whether or not the detected region is a place in which parking or stopping is prohibited such as a parking-stopping prohibited roadside zone, a pedestrian roadside zone, a parking-stopping prohibited place, or a stopping prohibited place. In a case where the detected region is a place in which parking or stopping is prohibited, the parking region detection unit 133 again performs detection of a region. In a case where the detected region is not a place in which parking or stopping is prohibited, the parking region detection unit 133 specifies the detected region as the parking region 300. The parking region detection unit 133 sets the detected parking region 300 on the map 200 illustrated in FIG. 3.

The parking direction specification unit 134 specifies a parking direction in a case where the subject vehicle 5 is parked at the parking region 300. For example, the parking direction specification unit 134 determines the parking direction by determining a type of parking. The types of parking include parallel parking and side-by-side parking. Parallel parking is a form in which the subject vehicle 5 is parked such that the other vehicles 7 and the subject vehicle 5 are aligned along the direction of a front-rear axis 8 of the subject vehicle 5 (see FIG. 6). Side-by-side parking is a form in which in a case where the subject vehicle 5 is parked at the parking region 300, the subject vehicle 5 is parked such that the other vehicles 7 and the subject vehicle 5 are aligned along a width direction 9 of the subject vehicle 5 (see FIG. 7).

Figure 4:
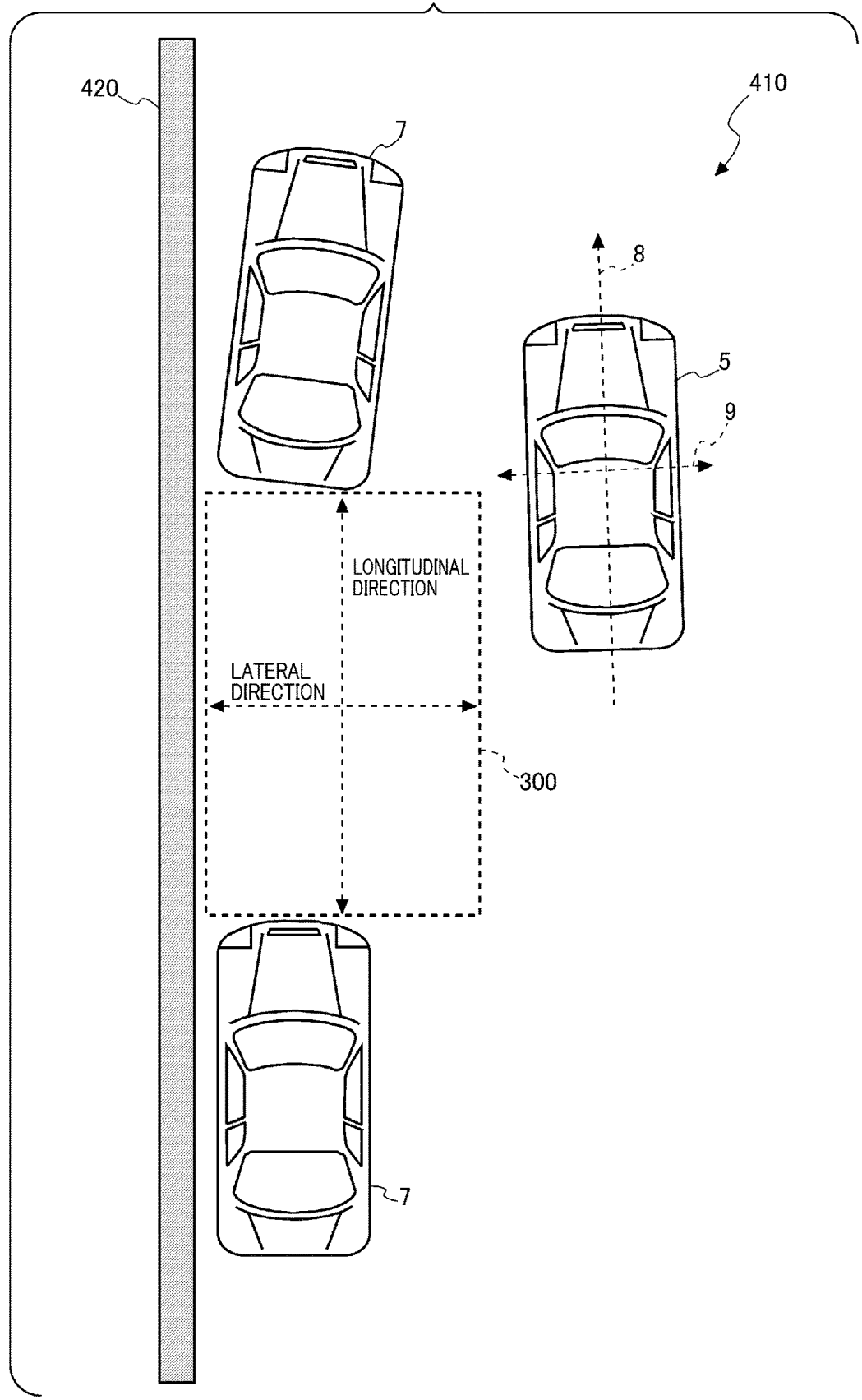
FIG. 4 is a diagram that illustrates parallel parking.
Figure 5:
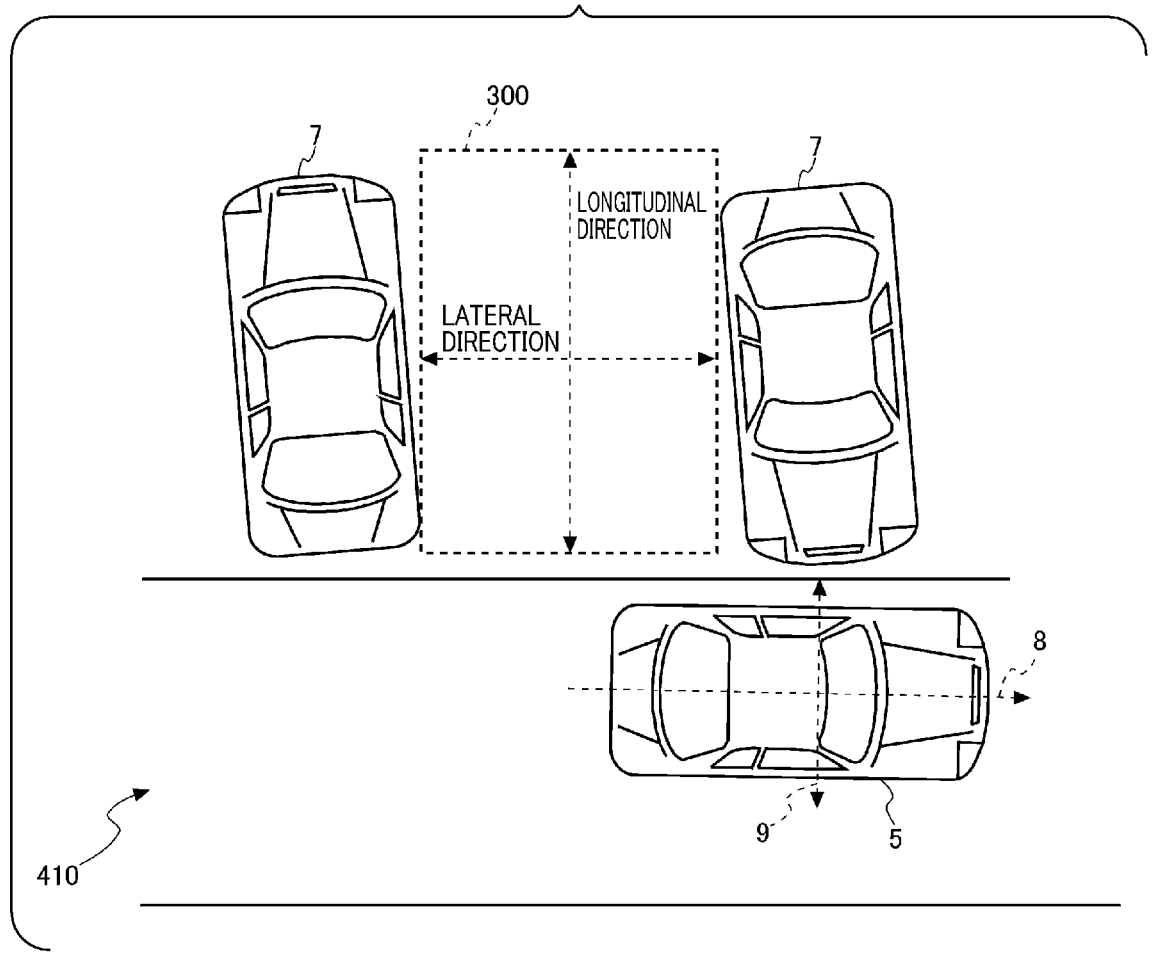
FIG. 5 is a diagram that illustrates side-by-side parking.

FIG. 4 illustrates a case where a parking mode to the parking region 300 is parallel parking, and FIG. 5 illustrates a case where the parking mode to the parking region 300 is side-by-side parking. The regions indicated by being surrounded by broken lines in FIG. 4 and FIG. 5 are the parking region 300. In FIG. 4, a curb 420 is provided on the left side of the other vehicles 7, and the other vehicles 7 are parked along the curb 420. The subject vehicle 5 is in a state of slowly traveling or being temporarily stopped on a passage 410. FIG. 4 illustrates a state where the other vehicles 7 are parked on both sides in the longitudinal direction of the parking region 300, but the other vehicles 7 may be parked only on one side in the longitudinal direction of the parking region 300. FIG. 5 illustrates a state where the other vehicles 7 are parked on both sides in the lateral direction of the parking region 300, but the other vehicles 7 may be parked only on one side in the lateral direction of the parking region 300.

In a case where a side surface of the other vehicle 7 parked at a neighboring region that neighbors the parking region 300 is detected from a captured image by the left side camera 33 or the right side camera 35 when the subject vehicle 5 is traveling on the passage 410, the parking direction specification unit 134 determines the type of parking of the parking region 300 to be parallel parking. In a case where a front surface or a rear surface of the other vehicle 7 parked at the neighboring region that neighbors the parking region 300 is detected from the captured image by the left side camera 33 or the right side camera 35 when the subject vehicle 5 is traveling on the passage 410, the parking direction specification unit 134 determines the type of parking of the parking region 300 to be side-by-side parking.

In a case where the other vehicles 7 are parked on both sides of the parking region 300, the parking direction specification unit 134 may compare the distance between the other vehicles 7 parked on the both sides with a reference value set in advance and thereby determine whether the parking mode is parallel parking or side-by-side parking. In a case of parallel parking, the distance between the other vehicles 7 is greater than the reference value, and in a case of side-by-side parking, the distance between the other vehicles 7 is smaller than the reference value.

Figure 6:
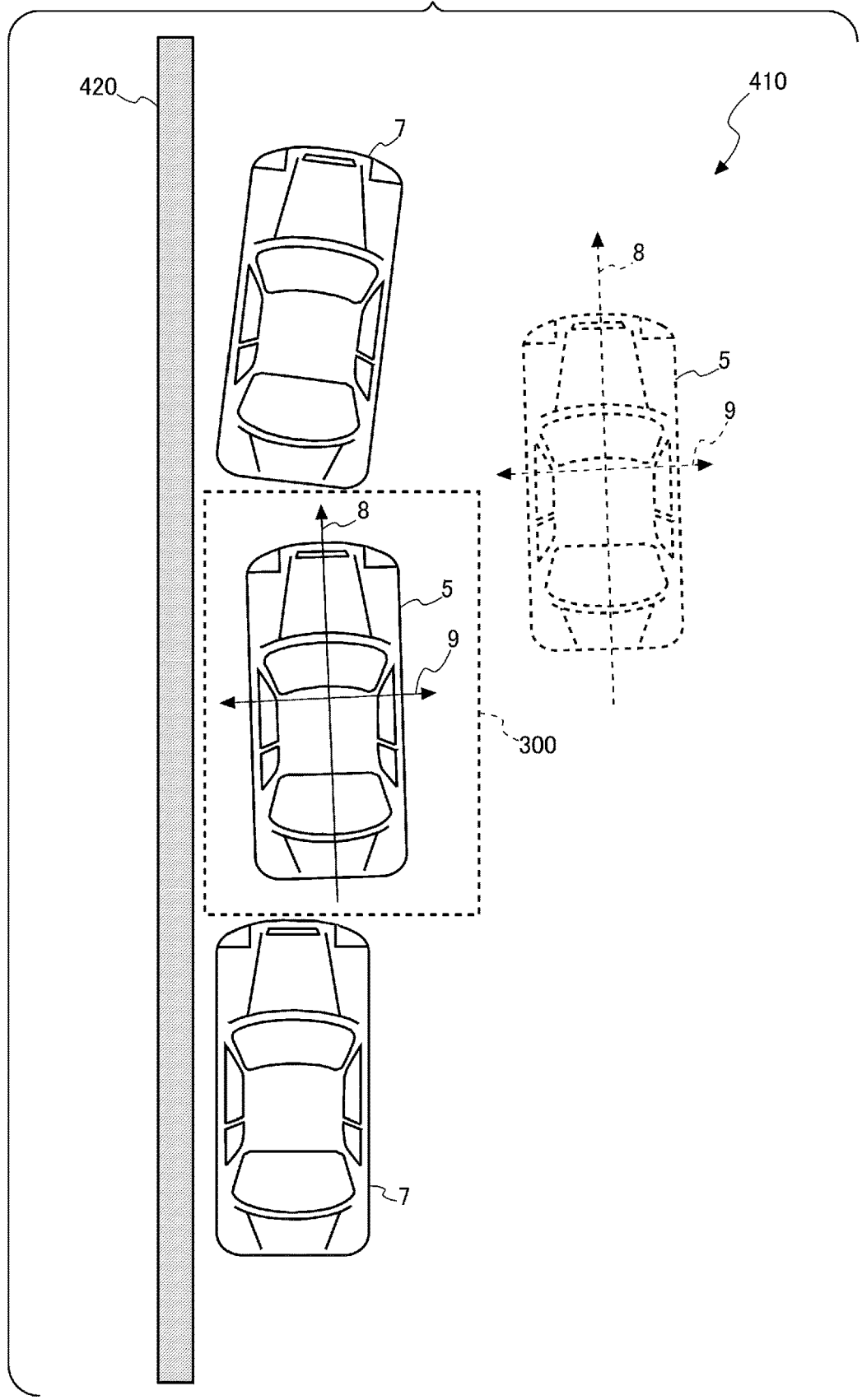
FIG. 6 is a diagram that illustrates a state where a subject vehicle is parked at a parking region for parallel parking.

FIG. 6 illustrates a state where the subject vehicle 5 is moved to the parking region 300 illustrated in FIG. 4.

In a case where the parking direction specification unit 134 determines that the subject vehicle 5 and the other vehicles 7 are in the positional relationship illustrated in FIG. 4 and the type of parking is parallel parking, the parking direction specification unit 134 determines the parking direction to be a direction in parallel with the front-rear axis 8 of the subject vehicle 5. The parking direction is the direction in which the front-rear axis 8 of the subject vehicle 5 is directed in a case where the subject vehicle 5 is parked at the parking region 300 based on the direction of the front-rear axis 8 or the width direction 9 of the subject vehicle 5 in the present position illustrated in FIG. 4. In the case of parallel parking, when the subject vehicle 5 is parked at the parking region 300, the direction of the front-rear axis 8 of the subject vehicle 5 that is not moved yet and the direction of the front-rear axis 8 of the subject vehicle 5 that is already moved become generally parallel directions as illustrated in FIG. 6. Note that the subject vehicle 5 that is not moved yet is indicated by broken lines in FIG. 6, and the subject vehicle 5 that is already moved is indicated by solid lines in FIG. 6. In this case, the parking direction specification unit 134 determines the parking direction to be a direction in parallel with the front-rear axis 8 of the subject vehicle 5.

Figure 7:
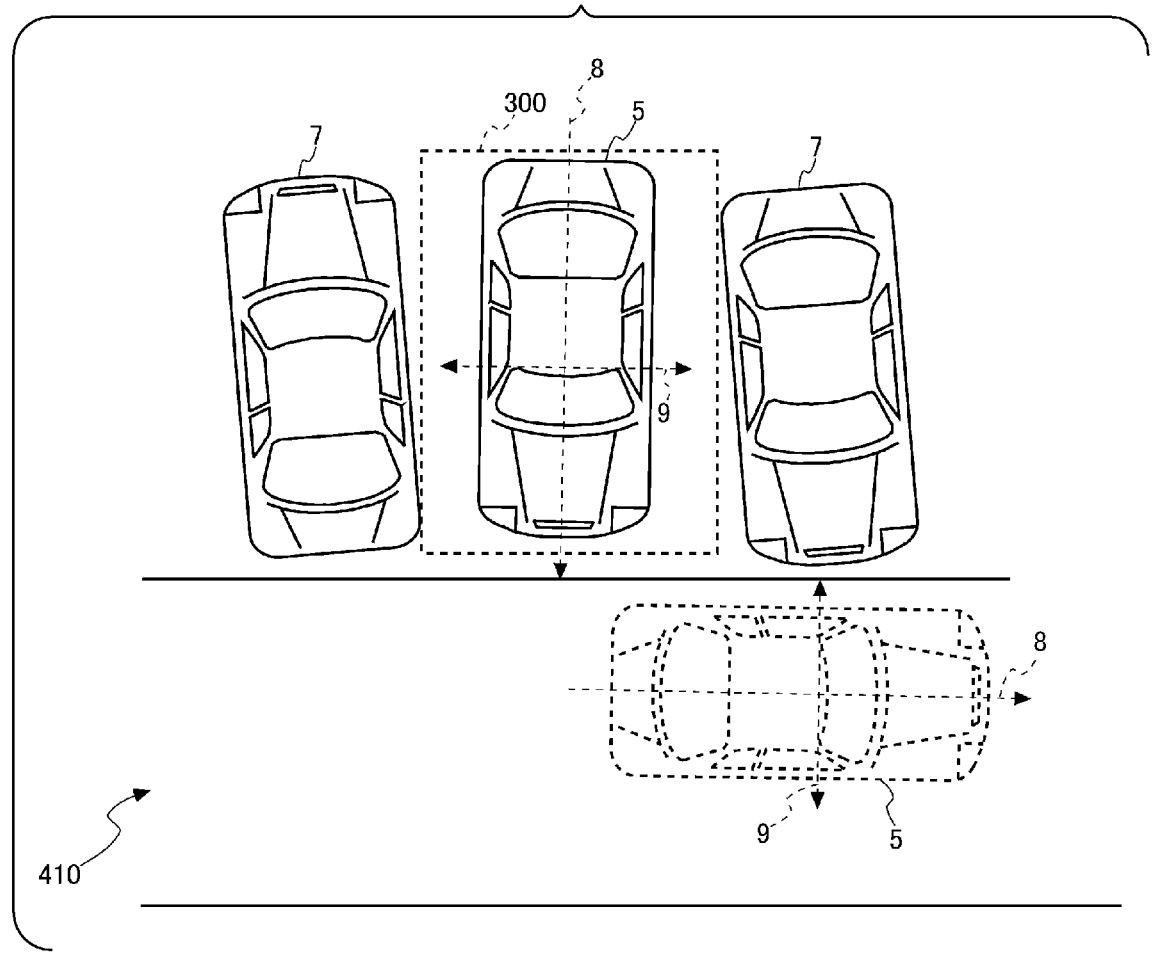
FIG. 7 is a diagram that illustrates a state where the subject vehicle is parked at a parking region for side-by-side parking.

FIG. 7 illustrates a state where the subject vehicle 5 illustrated in FIG. 5 is parked at the parking region 300.

In a case where the parking direction specification unit 134 determines that the subject vehicle 5 and the other vehicles 7 are in the positional relationship illustrated in FIG. 5 and the type of parking is side-by-side parking, the parking direction specification unit 134 determines the parking direction to be a direction in parallel with the width direction 9 of the subject vehicle 5. In the case of side-by-side parking, when the subject vehicle 5 is parked at the parking region 300, the width direction 9 of the subject vehicle 5 that is not moved yet and the direction of the front-rear axis 8 of the subject vehicle 5 that is already moved become generally parallel directions as illustrated in FIG. 7. Note that in FIG. 7, the subject vehicle 5 that is not moved yet is indicated by broken lines, and the subject vehicle 5 that is already moved is indicated by solid lines. In this case, the parking direction specification unit 134 determines the parking direction to be a direction in parallel with the width direction 9 of the subject vehicle 5.

Figure 8:
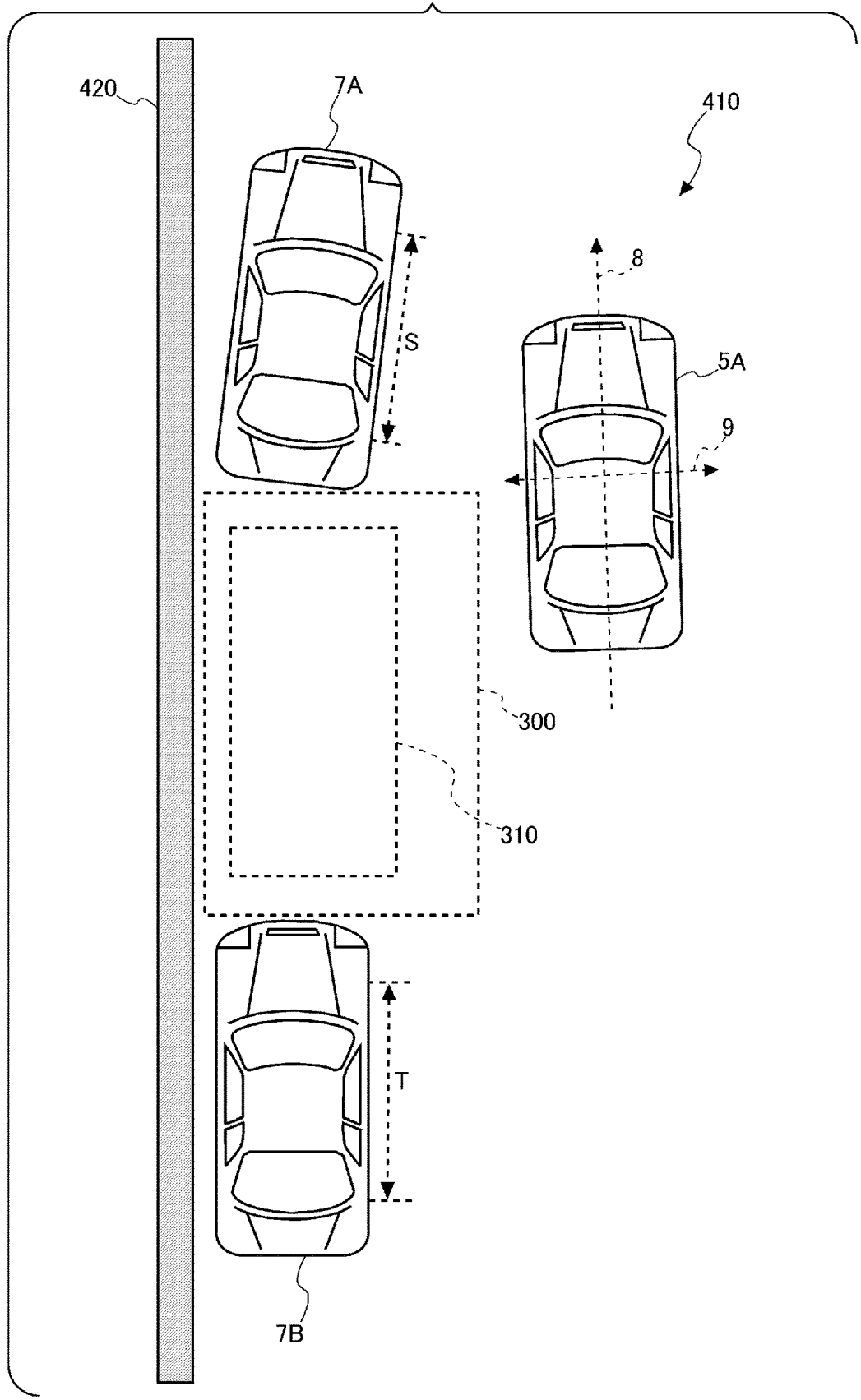
FIG. 8 is a diagram that illustrates a state where the parking region is seen from above.

FIG. 8 is a diagram that illustrates a state where the parking region 300 is seen from above. In particular, FIG. 8 is a diagram that illustrates a state where a tentative parking space 310 is set.

The tentative parking space setting unit 135 sets the tentative parking space 310 in the parking region 300 set on the map 200. The tentative parking space 310 represents a tentative parking position in a case where the subject vehicle 5 is parked at the parking region 300. For example, as illustrated in FIG. 8, in a case where other vehicles 7A and 7B are parked on both sides in the longitudinal direction (the direction of the front-rear axis 8 of the subject vehicle 5) of the parking region 300, the tentative parking space setting unit 135 sets the position of the tentative parking space 310 in the longitudinal direction of the parking region 300 to an intermediate position between the other vehicle 7A and the other vehicle 7B. In a case where the other vehicle 7 is parked on one side in the longitudinal direction of the parking region 300, the tentative parking space setting unit 135 sets the position of the tentative parking space 310 in the longitudinal direction of the parking region 300 such that the distance to the other vehicle 7 becomes a distance set in advance.

The tentative parking space setting unit 135 sets the position of the tentative parking space 310 in the lateral direction (width direction 9) of the parking region 300 based on the distances between the subject vehicle 5 and the other vehicles 7A and 7B.

For example, the tentative parking space setting unit 135 detects side surfaces of the other vehicles 7A and 7B and sets the position of the tentative parking space 310 in the width direction based on the distances between the detected side surfaces and the front-rear axis 8 of the subject vehicle 5. For example, the tentative parking space setting unit 135 sets a portion between a front wheel and a rear wheel of the other vehicle 7A as a side surface S of the other vehicle 7A and respectively obtains the distances between plural selected points on the side surface S and the front-rear axis 8 of the subject vehicle 5. The tentative parking space setting unit 135 sets a portion between a front wheel and a rear wheel of the other vehicle 7B as a side surface T of the other vehicle 7B and respectively obtains the distances between plural selected points on the side surface T and the front-rear axis 8 of the subject vehicle 5. The tentative parking space setting unit 135 calculates the average value of the obtained distances between the plural points on the side surfaces S and T and the front-rear axis 8 and sets the calculated average value as the position of the tentative parking space 310 in the width direction of the subject vehicle 5.

Figure 9:
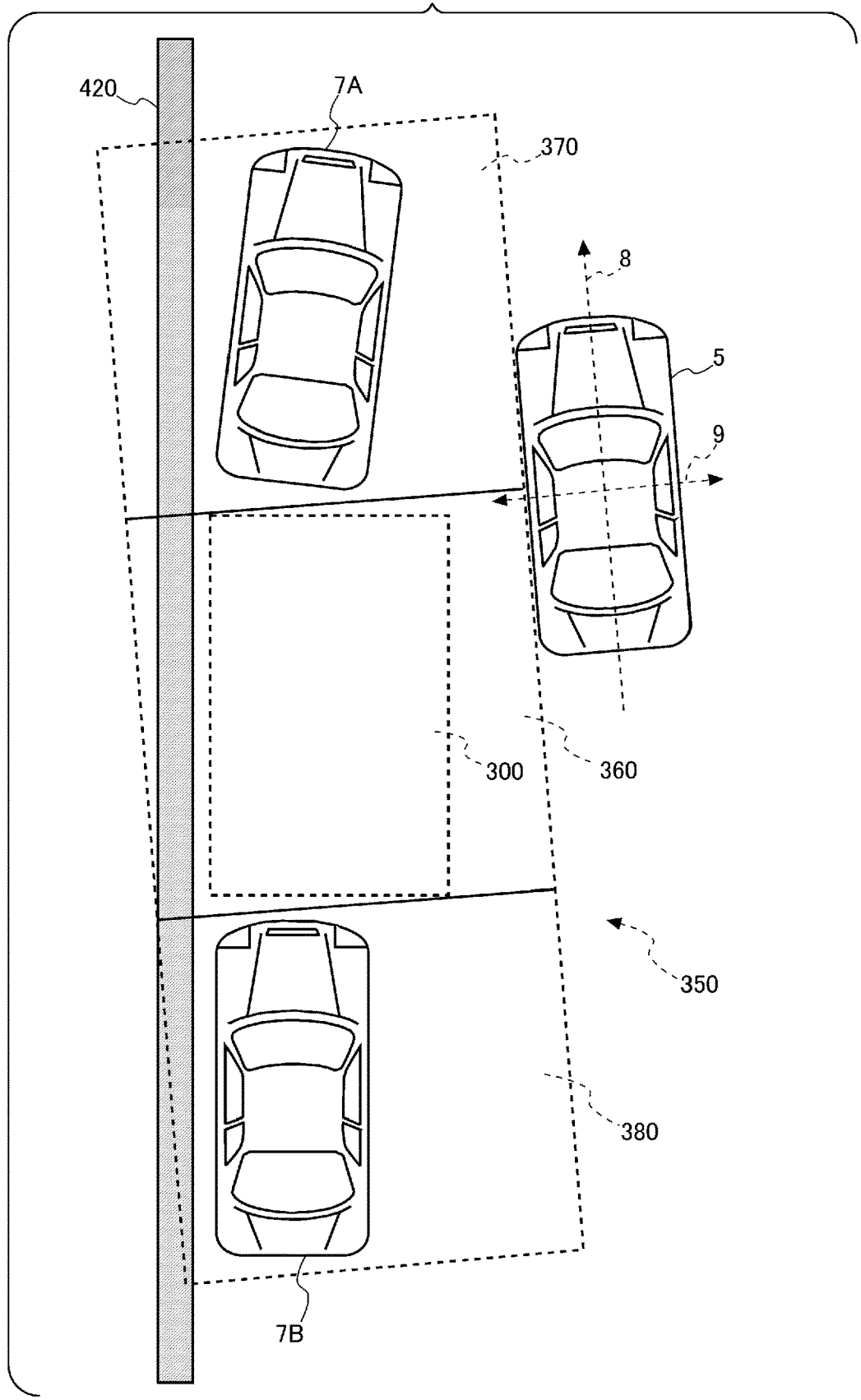
FIG. 9 is a diagram that illustrates a detection range in a case of parallel parking.
Figure 10:
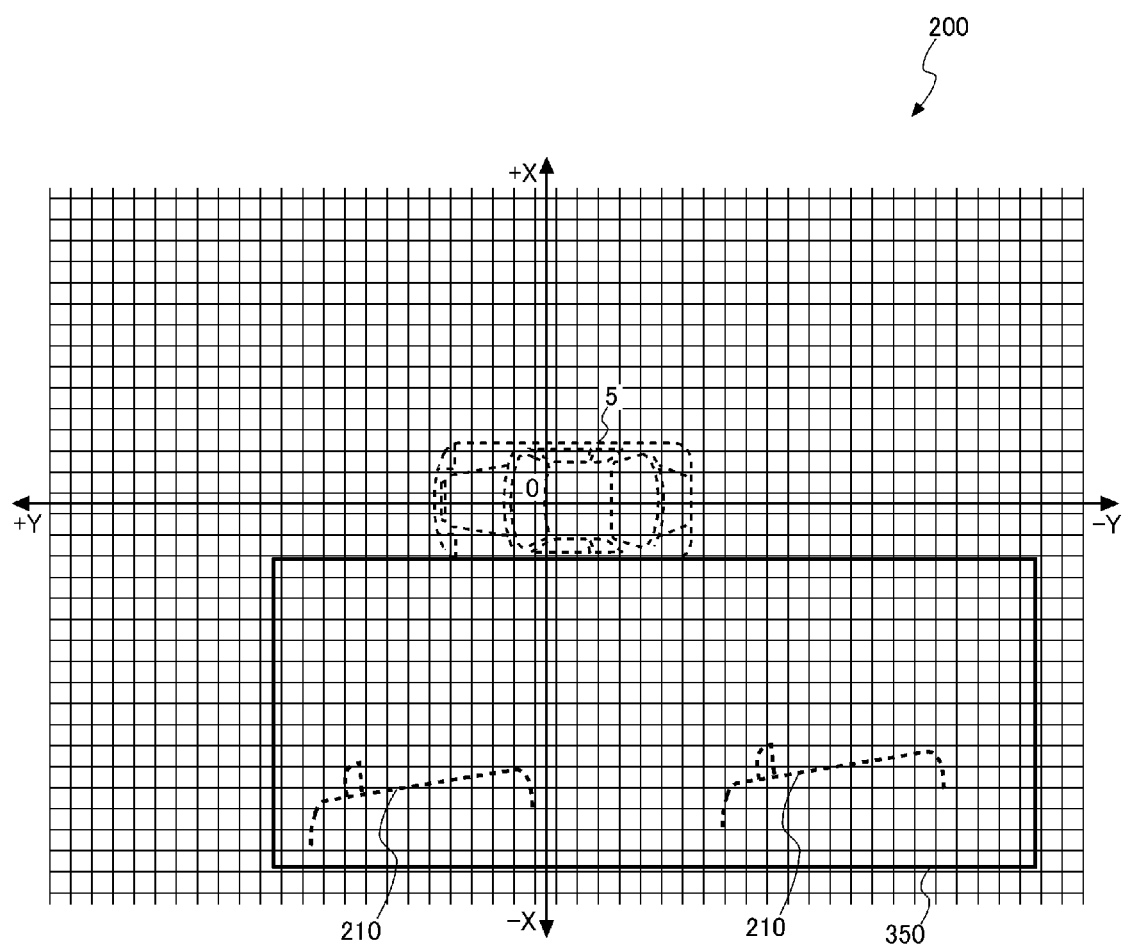
FIG. 10 is a diagram that illustrates one example of the map in which the detection range is set.

FIG. 9 and FIG. 10 are diagrams that illustrate a detection range 350.

The detection range setting unit 136 sets the detection range 350 on the map 200 based on the present position of the subject vehicle 5. The detection range 350 is a range for detecting obstacles such as the other vehicles 7, a curb, a guard rail, a wall, and a fence. For convenience of description, FIG. 9 illustrates the detection range 350 while superimposing that on the subject vehicle 5 and the other vehicles 7, but actually, the detection range setting unit 136 sets the detection range 350 on the map 200. FIG. 10 illustrates a state where the detection range 350 is set on the map 200. Although the detection range 350 is indicated by solid lines in FIG. 10, data that indicates the detection range 350 does not have to be recorded on the map 200, but the coordinates or the like on the map 200, which correspond to the detection range 350, may be recorded in the memory 110. Note that in FIG. 10, the position of the subject vehicle 5 is indicated by broken lines to make clear the positional relationship between the subject vehicle 5 and the detection range 350.

The longitudinal direction of the detection range 350 is set to a direction in parallel with the front-rear axis 8 of the subject vehicle 5. The detection range 350 includes three ranges of a first detection range 360, a second detection range 370, and a third detection range 380. The first detection range 360 is set as a range that includes the parking region 300. The size of the first detection range 360 in the width direction 9 of the subject vehicle 5 is set wider than the parking region 300 in order to detect obstacles such as a curb, a guard rail, a wall, and a fence, for example.

The second detection range 370 and the third detection range 380 are ranges that neighbor the first detection range 360. The second detection range 370 is a region that abuts on the first detection range 360 in a front area in the direction of the front-rear axis 8 of the subject vehicle 5. The third detection range 380 is a region that abuts on the first detection range 360 in a rear area in the direction of the front-rear axis 8 of the subject vehicle 5.

The lengths of the second detection range 370 and the third detection range 380 in the direction of the front-rear axis 8 of the subject vehicle 5 are set based on the size in which the full length of a vehicle is detectable, for example. For example, in a case where it is detected that the other vehicle 7 is a bus or a truck based on a captured image by the image-capturing unit 30, the length of the second detection range 370 or the third detection range 380 in the longitudinal direction may be changed such that the detection range corresponds to the bus or truck.

Figure 11:
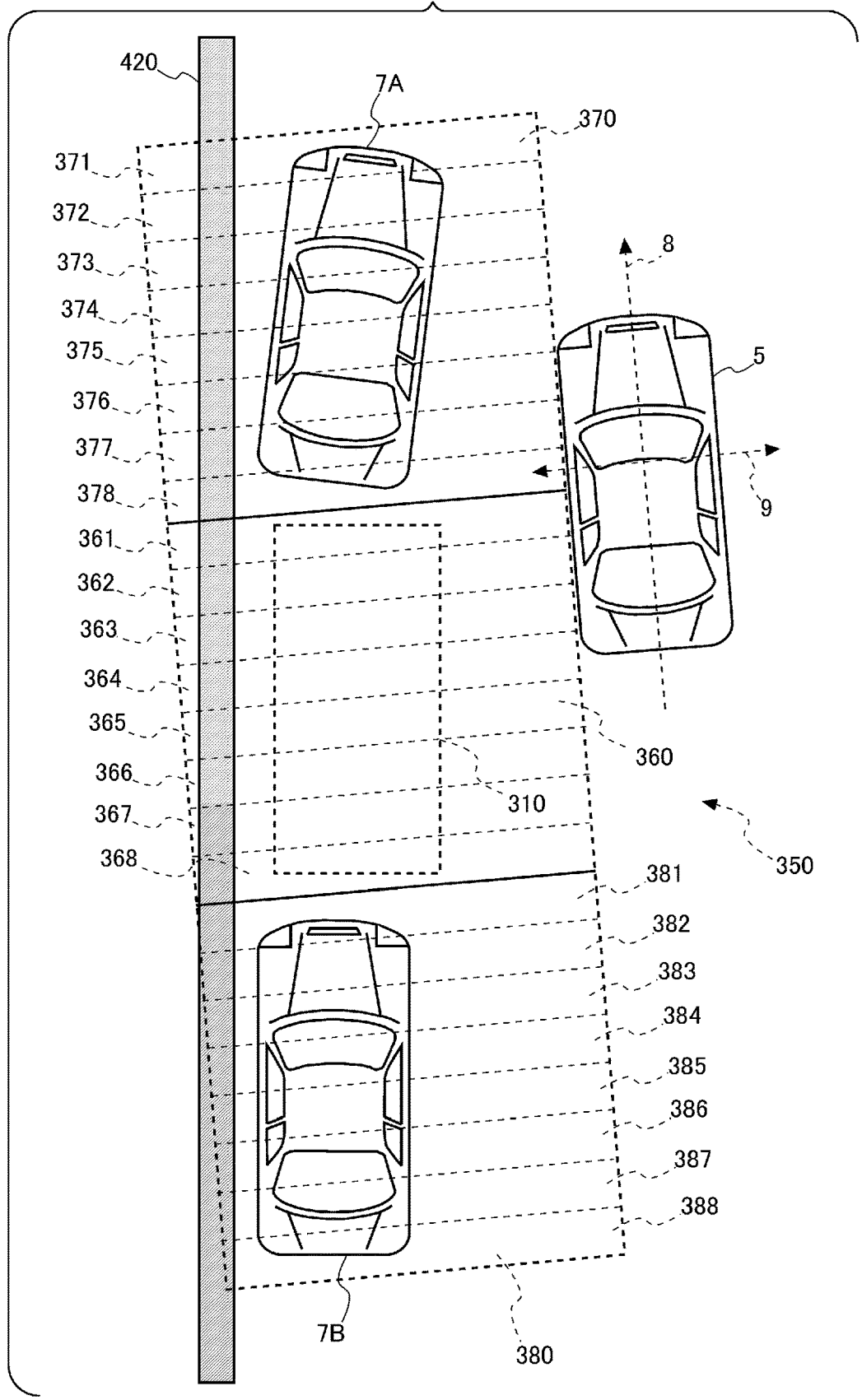
FIG. 11 is a diagram that illustrates a state where the detection range is divided into plural divided ranges.

FIG. 11 is a diagram that illustrates a state where the detection range 350 is divided into plural divided ranges.

The division unit 137 divides the detection range 350 set by the detection range setting unit 136 and thereby generates plural divided ranges. In a case where the parking direction specification unit 134 determines the parking direction to be a direction in parallel with the direction of the front-rear axis 8 of the subject vehicle 5, the division unit 137 determines a division direction of the detection range 350 to be a direction orthogonal to the direction of the front-rear axis 8 of the subject vehicle 5. "The direction orthogonal to the direction of the front-rear axis 8 of the subject vehicle 5" is a direction that is associated with a case where the parking direction is determined to be a direction in parallel with the direction of the front-rear axis 8 of the subject vehicle 5. In a case where the parking direction specification unit 134 determines the parking direction to be a direction in parallel with the width direction 9 of the subject vehicle 5, the division unit 137 determines the division direction of the detection range 350 to be a direction orthogonal to the width direction 9 of the subject vehicle 5. "The direction orthogonal to the width direction 9 of the subject vehicle 5" is a direction that is associated with a case where the parking direction is determined to be a direction in parallel with the width direction 9 of the subject vehicle 5.

FIG. 11 illustrates a state where each of the first detection range 360, the second detection range 370, and the third detection range 380 is equally divided into eight portions in the direction orthogonal to the direction of the front-rear axis 8 of the subject vehicle 5.

The first detection range 360 is divided into eight regions of a divided range 361, a divided range 362, a divided range 363, a divided range 364, a divided range 365, a divided range 366, a divided range 367, and a divided range 368.

The second detection range 370 is divided into eight regions of a divided range 371, a divided range 372, a divided range 373, a divided range 374, a divided range 375, a divided range 376, a divided range 377, and a divided range 378.

The third detection range 380 is divided into eight regions of a divided range 381, a divided range 382, a divided range 383, a divided range 384, a divided range 385, a divided range 386, a divided range 387, and a divided range 388.

Note that although FIG. 11 illustrates the state where each of the first detection range 360, the second detection range 370, and the third detection range 380 is equally divided into eight portions, the number of divisions is not limited to eight but may be an arbitrary number. The numbers of divisions may be different among the first detection range 360, the second detection range 370, and the third detection range 380.

The bearing calculation unit 138 detects the bearing of an obstacle in each of the divided ranges 361 to 368, 371 to 378, and 381 to 388.

For example, describing the divided range 361 of the first detection range 360 as an example, the bearing calculation unit 138 refers to a region on the map 200 that corresponds to the divided range 361 and specifies pixels on the map 200, the pixels in which the data 210 which indicates that an obstacle is detected is recorded. In a case where at least two or more pixels in which the data 210 is recorded are detected in the divided range 361, the bearing calculation unit 138 calculates the coefficient of a model function based on the method of least squares such that the squared error between the model function and the coordinate values of the pixels in which the data 210 is recorded becomes the minimum and detects the bearing of the obstacle in the divided range 361. On the map 200, the distance to a side surface of an obstacle that faces the subject vehicle 5 is recorded. Thus, in a case where at least two or more pixels in which the data 210 is recorded are detected, the bearing of the obstacle is detected based on the method of least squares, and the bearing of the side surface of the obstacle that faces the subject vehicle 5 is thereby specified.

The bearing calculation unit 138 performs similar processing for the other divided ranges 362 to 368. Further, the bearing calculation unit 138 performs similar processing for the divided ranges 371 to 378 and 381 to 388 of the second detection range 370 and the third detection range 380 and detects the bearing of an obstacle in each of the divided ranges 371 to 378 and 381 to 388. Note that in case where only one piece of data 210 that indicates an obstacle is detected in the region on the map 200 that corresponds to the divided range or a case where the data 210 is not recorded, the bearing calculation unit 138 determines that an obstacle is not present in this divided range.

Next, the bearing calculation unit 138 calculates the bearing of the tentative parking space 310. The bearing calculation unit 138 calculates the longitudinal direction of the tentative parking space 310 set on the map 200 as the bearing of the tentative parking space 310.

Next, the bearing calculation unit 138 compares the bearing of the obstacle which is calculated for each of the divided ranges 361 to 368 as the divided ranges of the first detection range 360 with the bearing of the tentative parking space 310.

The bearing calculation unit 138 causes the memory 110 to store the bearings, whose differences from the bearing of the tentative parking space 310 are smaller than a threshold value, among the bearings of the obstacle in the divided ranges 361 to 368 and deletes the bearings, whose differences from the bearing of the tentative parking space 310 are the threshold value or greater, without causing the memory 110 to store those. A front end portion or a rear end portion of the other vehicle 7 may be configured with a curve such as a bumper, for example. In a case where this curved portion is detected as the bearing of the obstacle and the bearing of the other vehicle 7 is calculated by using the detected bearing, the bearing of the other vehicle 7 may include an error and thus not become a preferable bearing. Thus, the bearing calculation unit 138 excludes the bearings in the divided ranges 361 to 368, whose differences from the bearing of the tentative parking space 310 are the threshold value set in advance or greater, from the bearings subjected to calculation of the average value.

The bearing calculation unit 138 also compares the bearing of the obstacle which is calculated for each of the divided ranges 371 to 378 as the divided ranges of the second detection range 370 with the bearing of the tentative parking space 310. The bearing calculation unit 138 causes the memory 110 to store the bearings, whose differences from the bearing of the tentative parking space 310 are smaller than the threshold value, among the bearings of the obstacle in the divided ranges 371 to 378 and deletes the bearings, whose differences from the bearing of the tentative parking space 310 are the threshold value or greater, without causing the memory 110 to store those.

Similarly, the bearing calculation unit 138 also compares the bearing of the obstacle which is calculated for each of the divided ranges 381 to 388 as the divided ranges of the third detection range 380 with the bearing of the tentative parking space 310. The bearing calculation unit 138 causes the memory 110 to store the bearings, whose differences from the bearing of the tentative parking space 310 are smaller than the threshold value, among the bearings of the obstacle in the divided ranges 381 to 388 and deletes the bearings, whose differences from the bearing of the tentative parking space 310 are the threshold value or greater, without causing the memory 110 to store those.

Figure 12:
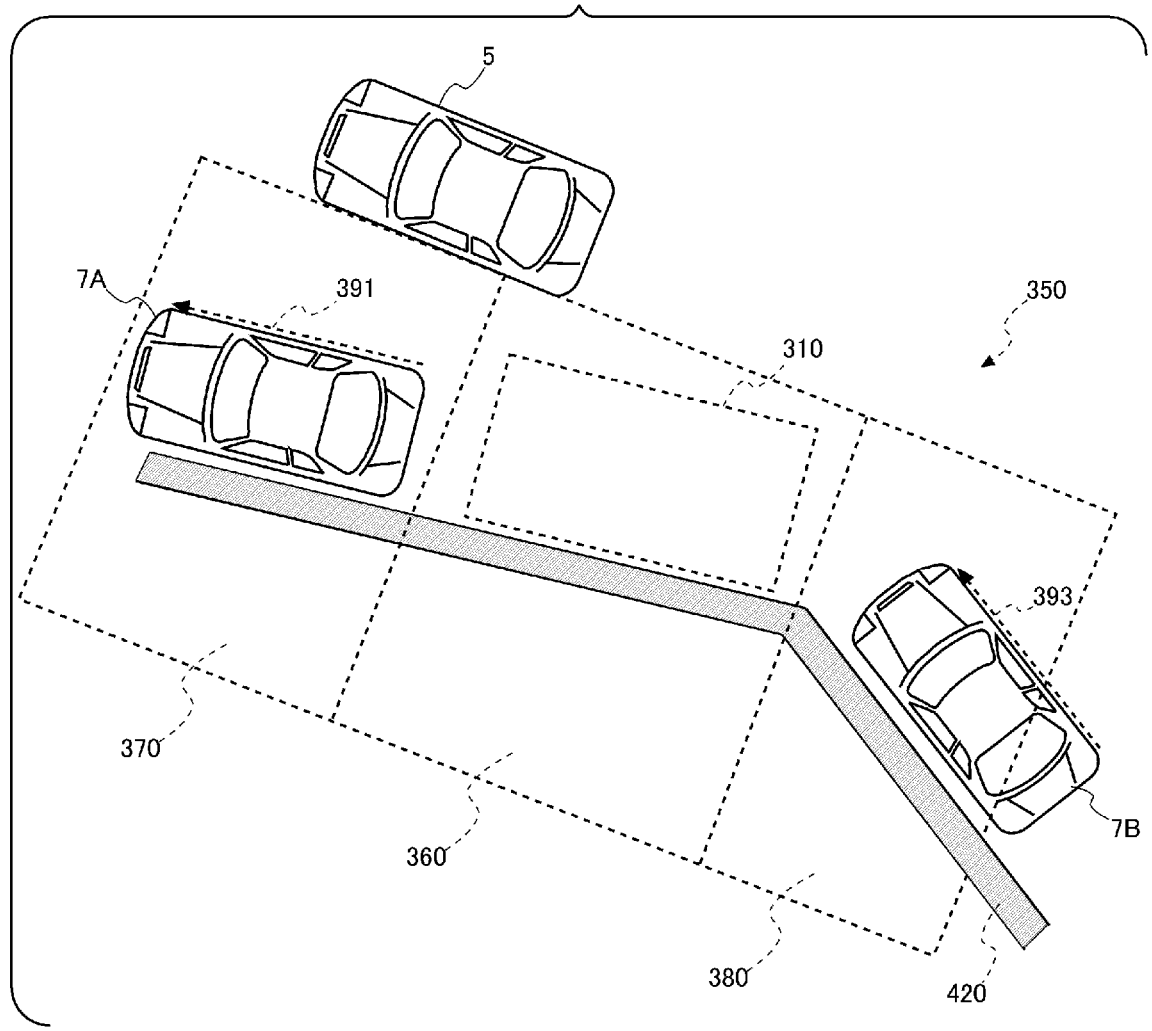
FIG. 12 is a diagram that illustrates a case where the detection range is excluded.

FIG. 12 is a diagram that illustrates the detection range 350.

FIG. 12 illustrates a state where the other vehicles 7A and 7B are parked along a shoulder of a road. The road is largely bent, and directions are largely different between the bearing of the side surface of the other vehicle 7A which is detected in the second detection range 370 and the bearing of the side surface of the other vehicle 7B which is detected in the third detection range 380. In such a case, in a case where the average value of the bearing of the obstacle which is detected in the second detection range 370 and the bearing of the obstacle which is detected in the third detection range 380 is set as the bearing of the tentative parking space 310, the bearing of the subject vehicle 5 parked at the parking region 300 may not become a preferable bearing. Thus, in this embodiment, the bearings, whose differences from the bearing of the tentative parking space 310 are the threshold value or greater, among the bearings of the obstacle in the divided ranges 371 to 378 as the divided ranges of the second detection range 370 are deleted without causing the memory 110 to store those. Similarly, the bearings, whose differences from the bearing of the tentative parking space 310 are the threshold value or greater, among the bearings of the obstacle in the divided ranges 381 to 388 as the divided ranges of the third detection range 380 are deleted without causing the memory 110 to store those.

Next, the bearing calculation unit 138 acquires the bearings of the obstacle in the divided ranges 361 to 368 from the memory 110. The bearing calculation unit 138 does not acquire the bearings, which are deleted without causing the memory 110 to store, among the divided ranges 361 to 368. The bearing calculation unit 138 acquires the bearings of the obstacle in the divided ranges 361 to 368 and then obtains the average value of the acquired bearings of the obstacle. The obtained bearing of the obstacle is stored as the bearing of the obstacle in the first detection range 360 in the memory 110.

Similarly, the bearing calculation unit 138 acquires the bearings of the obstacle in the divided ranges 371 to 378 from the memory 110. The bearing calculation unit 138 does not acquire the bearings, which are deleted without causing the memory 110 to store, among the divided ranges 371 to 378. The bearing calculation unit 138 acquires the bearings of the obstacle which correspond to the divided ranges 371 to 378 and then obtains the average value of the acquired bearings of the obstacle. The obtained bearing of the obstacle is stored as the bearing of the obstacle in the second detection range 370 in the memory 110.

Similarly, the bearing calculation unit 138 acquires the bearings of the obstacle in the divided ranges 381 to 388 from the memory 110. The bearing calculation unit 138 does not acquire the bearings, which are deleted without causing the memory 110 to store, among the divided ranges 381 to 388. The bearing calculation unit 138 acquires the bearings of the obstacle which correspond to the divided ranges 381 to 388 and then obtains the average value of the acquired bearings of the obstacle. The obtained bearing of the obstacle is stored as the bearing of the obstacle in the third detection range 380 in the memory 110.

The parking position setting unit 139 determines whether or not the bearing of the obstacle in the first detection range 360 is calculated by the bearing calculation unit 138. In a case where the bearing of the obstacle in the first detection range 360 is calculated, the parking position setting unit 139 sets the parking position based on the calculated bearing of the obstacle in the first detection range 360 and the tentative parking space 310. For example, the parking position setting unit 139 sets the bearing of the parking position to the bearing of the obstacle in the first detection range 360 and sets the sizes of the parking position in vertical and horizontal directions to the sizes that correspond to the sizes of the tentative parking space 310.

Because the first detection range 360 is a region that includes the parking region 300, the other vehicle 7 is not detected as an obstacle in the first detection range 360. In the first detection range 360, a curb, a guard rail, a wall, or the like is detected as an obstacle. Thus, the bearing of the parking position is caused to agree with the bearing of a curb or a guard rail, the subject vehicle 5 may thereby be parked along the curb or the guard rail, and the bearing of the parked subject vehicle 5 may be set to a preferable bearing.

In a case where the bearing of the obstacle in the first detection range 360 is not calculated, the parking position setting unit 139 sets the parking position based on the average value of the bearing of the obstacle in the second detection range 370 and the bearing of the obstacle in the third detection range 380 and the tentative parking space 310. Accordingly, in a case where the other vehicle 7 is parked at at least one of the front area and the rear area in the direction of the front-rear axis 8 of the subject vehicle 5, the bearing of the subject vehicle 5 in the parking position may be caused to match the bearing of the other vehicle 7 as the obstacle.

Figure 13:
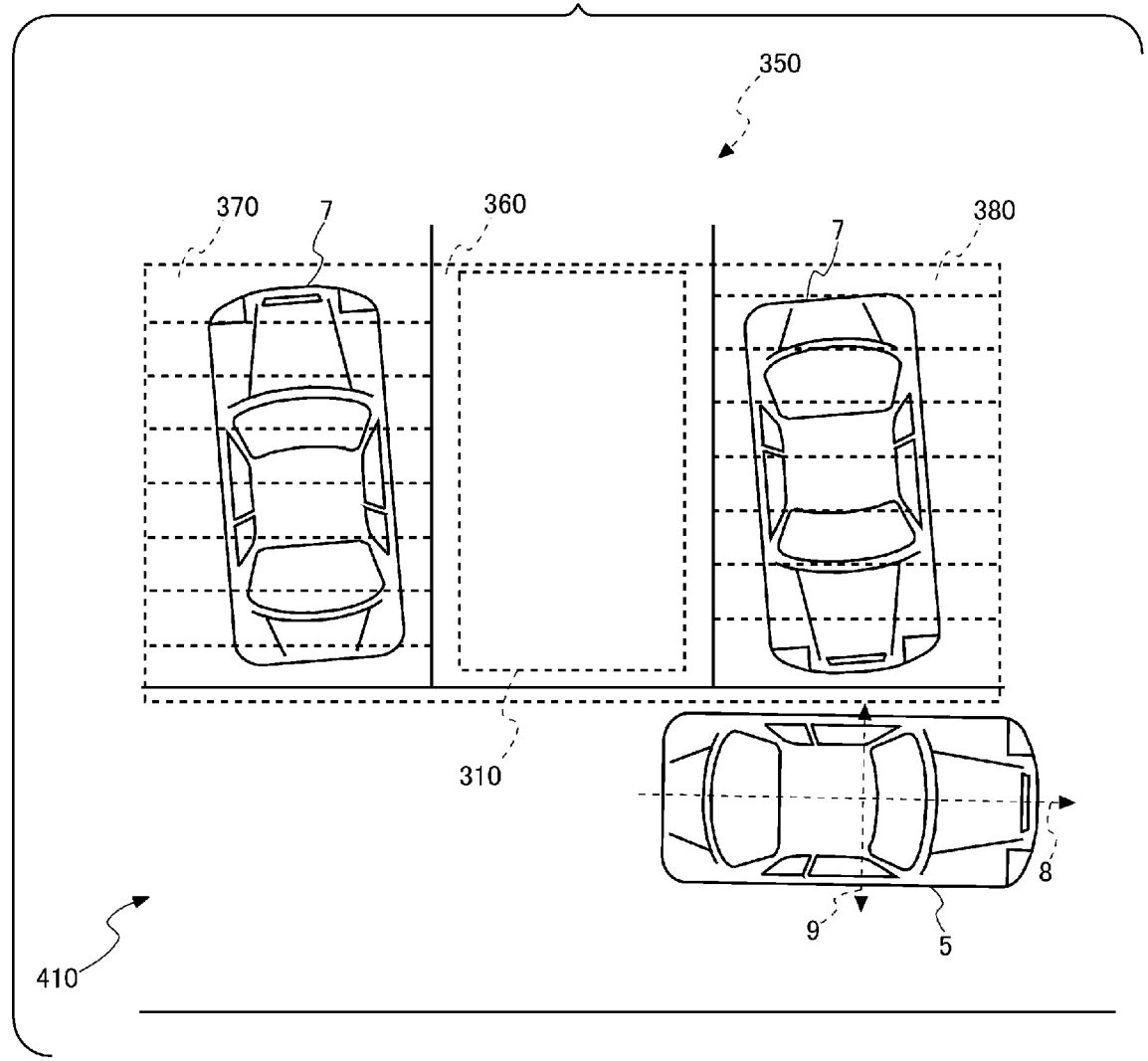
FIG. 13 is a diagram that illustrates the detection range in a case of side-by-side parking.

FIG. 13 is a diagram that illustrates the first detection range 360, the second detection range 370, and the third detection range 380 in a case where the type of parking is side-by-side parking and illustrates a state where those ranges are divided into plural divided ranges.

In a case where the type of parking of the subject vehicle 5 is side-by-side parking, the parking direction specification unit 134 determines the parking direction to be a direction in parallel with the width direction 9 of the subject vehicle 5. In a case where the parking direction of the subject vehicle 5 is a direction in parallel with the width direction 9, the division unit 137 divides the first detection range 360, the second detection range 370, and the third detection range 380 in a direction orthogonal to the width direction 9 as a direction associated with the parking direction. Then, the bearing calculation unit 138 calculates the bearing of an obstacle which is detected in each of the divided ranges 361 to 368, 371 to 378, and 381 to 388, which result from division of the first detection range 360, the second detection range 370, and the third detection range 380. Subsequently, the bearing calculation unit 138 calculates the average value of the bearings of the obstacle in the divided ranges 361 to 368 as the bearing of the obstacle in the first detection range 360. Similarly, the bearing calculation unit 138 calculates the average value of the bearings of the obstacle in the divided ranges 371 to 378 as the bearing of the obstacle in the second detection range 370 and calculates the average value of the bearings of the obstacle in the divided ranges 381 to 388 as the bearing of the obstacle in the third detection range 380.

The parking route calculation unit 140 calculates the parking route that reaches the parking position set by the parking position setting unit 139 from the present position of the subject vehicle 5. The parking route includes a turn-about position necessary for movement to the parking position. The parking route is defined as a line and further defined as a belt-like region in consideration of a vehicle width of the subject vehicle 5.

Figure 14:
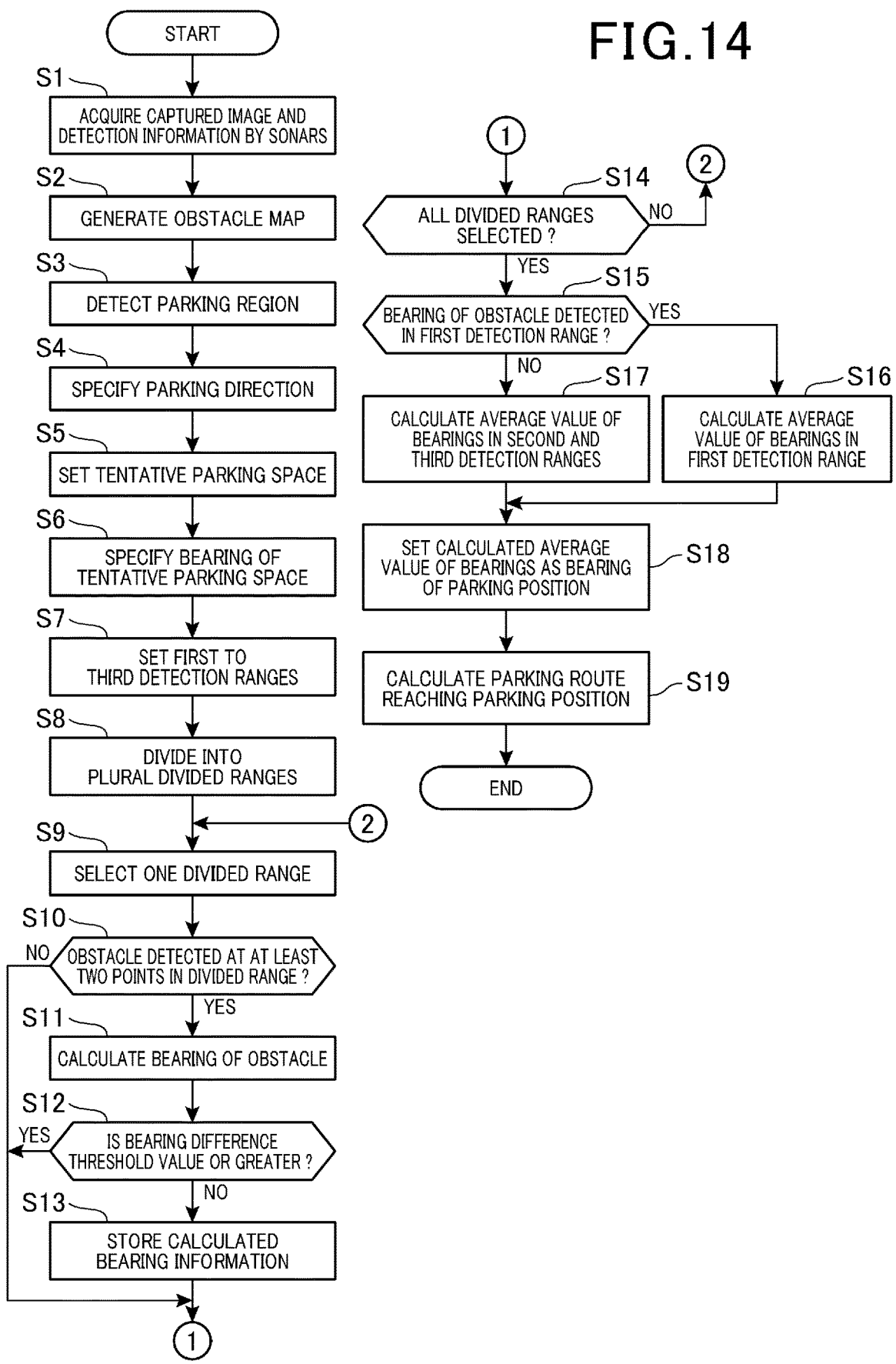
FIG. 14 is a flowchart that illustrates an action of the parking assistance device.

FIG. 14 is a flowchart that illustrates an action of the parking assistance device 100 of this embodiment.

The action of this embodiment will be described with reference to the flowchart illustrated in FIG. 14.

First, the parking assistance device 100 acquires the detection information by the sensor unit 10 or a captured image by the image-capturing unit 30 from the memory 110 (step S1).

The parking assistance device 100 detects an obstacle present around the subject vehicle 5 by analyzing the acquired detection information by the sensor unit 10 or a transformed image. The parking assistance device 100 records the data 210, which indicates that the obstacle is present, in the position on the map 200 which corresponds to the distance or bearing of the detected obstacle and thereby generates the map 200 (step S2). Step S2 corresponds to "obstacle detection step" of the present invention.

Next, the parking assistance device 100 detects the parking region 300 (step S3). Step S3 corresponds to "parking region detection step" of the present invention.

First, the parking assistance device 100 acquires the map data 75 that includes the present position of the subject vehicle 5 from the navigation device 50. The parking assistance device 100 refers to the map 200 and detects a region that has an expanse in which the subject vehicle 5 is capable of being parked and does not hinder travel of the other vehicle 7 when the subject vehicle 5 is parked. The parking assistance device 100 determines whether or not the detected region is a place in which parking or stopping is prohibited such as a parking-stopping prohibited roadside zone, a pedestrian roadside zone, a parking-stopping prohibited place, or a stopping prohibited place by referring to the map data 75. In a case where parking and stopping are not prohibited in the detected region, the parking assistance device 100 determines the detected region to be the parking region.

Next, the parking assistance device 100 determines the type of parking of the parking region 300 and specifies the parking direction (step S4). Step S4 corresponds to "parking direction specification step" of the present invention.

For example, in a case where the side surface of the other vehicle 7 is detected from a captured image by the left side camera 33 or the right side camera 35, the parking assistance device 100 determines the type of parking of the parking region 300 to be parallel parking. In a case where the front surface or the rear surface of the other vehicle 7 is detected from a captured image by the left side camera 33 or the right side camera 35, the parking assistance device 100 determines the type of parking of the parking region 300 to be side-by-side parking. In a case where the type of parking is determined to be parallel parking, the parking assistance device 100 specifies the parking direction to be a direction in parallel with the direction of the front-rear axis 8 of the subject vehicle 5. In a case where the type of parking is side-by-side parking, the parking direction specification unit 134 specifies the parking direction to be a direction in parallel with the width direction 9 of the subject vehicle 5.

Next, the parking assistance device 100 sets the tentative parking space 310 on the map 200 (step S5). Step S5 corresponds to "tentative parking space setting step" of the present invention.

For example, as illustrated in FIG. 8, in a case where the other vehicles 7A and 7B are parked on the both sides in the longitudinal direction of the parking region 300, the tentative parking space setting unit 135 sets the position of the tentative parking space 310 in the direction of the front-rear axis 8 of the subject vehicle 5 to a position in equivalent distances from the other vehicle 7A and the other vehicle 7B.

The parking assistance device 100 sets the position of the tentative parking space 310 in the width direction 9 of the subject vehicle 5 based on the distances between the subject vehicle 5 and the other vehicles 7A and 7B. For example, the tentative parking space setting unit 135 detects the side surfaces of the other vehicles 7A and 7B and sets the position of the tentative parking space 310 in the width direction based on the distances between the detected side surfaces and the front-rear axis 8 of the subject vehicle 5.

Next, the parking assistance device 100 specifies the bearing of the tentative parking space 310 (step S6). The parking assistance device 100 calculates the longitudinal direction of the tentative parking space 310 set on the map 200 as the bearing of the tentative parking space 310.

Next, the parking assistance device 100 sets the first detection range 360, the second detection range 370, and the third detection range 380 on the map 200 while setting the present position of the subject vehicle 5 as a reference (step S7). Step S7 corresponds to "detection range setting step" of the present invention.

Next, the parking assistance device 100 respectively divides the first detection range 360, the second detection range 370, and the third detection range 380 into plural divided ranges 361 to 368, 371 to 378, and 381 to 388 (step S8). Step S8 corresponds to "division step" of the present invention. Here, in a case where the parking direction specified in step S4 is a direction in parallel with the direction of the front-rear axis 8 of the subject vehicle 5, the parking assistance device 100 divides the first detection range 360, the second detection range 370, and the third detection range 380 in a direction orthogonal to the direction of the front-rear axis 8. In a case where the parking direction specified in step S4 is a direction in parallel with the width direction 9 of the subject vehicle 5, the parking assistance device 100 divides the first detection range 360, the second detection range 370, and the third detection range 380 in a direction orthogonal to the width direction.

Next, the parking assistance device 100 selects one of the divided ranges (step S9). The parking assistance device 100 refers to a region on the map which corresponds to the selected divided range and determines whether or not an obstacle is detected at at least two points in the divided range (step S10). In a case where an obstacle is not detected at at least two points in the divided range (step S10: NO), the parking assistance device 100 moves to a determination in step S14 and determines whether or not all the divided ranges are selected.

In a case where an obstacle is detected at at least two points in the divided range (step S10: YES), the parking assistance device 100 calculates the bearing of the obstacle in the divided range (step S11). Step S11 corresponds to "bearing calculation step" of the present invention. Specifically, the parking assistance device 100 calculates the coefficient of the model function based on the method of least squares such that the squared error between the model function and the coordinate values of the pixels in which the data 210 is recorded becomes the minimum and detects the bearing of the obstacle in the divided range.

Next, the parking assistance device 100 determines whether or not the difference between the calculated bearing of the obstacle in the divided range and the bearing of the tentative parking space 310 is the threshold value or greater (step S12). In a case where the difference between the bearing of the obstacle in the divided range and the bearing of the tentative parking space 310 is the threshold value or greater (step S12: YES), the parking assistance device 100 discards the calculated bearing and moves to the determination in step S14.

In a case where the difference between the bearing of the obstacle in the divided range and the bearing of the tentative parking space 310 is smaller than the threshold value (step S12: NO), the parking assistance device 100 causes the memory 110 to store the bearing of the obstacle in the divided range (step S13).

Next, the parking assistance device 100 determines whether or not all the divided ranges are selected (step S14).

In a case where all the divided ranges are not selected (step S14: NO), the parking assistance device 100 returns to a processing of step S9 and selects one of the divided ranges. In a case where all the divided ranges are selected (step S14: YES), the parking assistance device 100 determines whether or not the bearings of the obstacle are calculated in the divided ranges 361 to 368 resulting from division of the first detection range 360 (step S15).

In a case where the bearings of the obstacle in the divided ranges 361 to 368 resulting from division of the first detection range 360 are detected (step S15: YES), the parking assistance device 100 calculates the average value of the bearings in the divided ranges 361 to 368 included in the first detection range 360 (step S16). Then, the parking assistance device 100 sets the parking position based on the tentative parking space 310 and the calculated average value of the bearings in the first detection range 360. That is, the parking assistance device 100 sets the bearing of the parking position to the average value of the bearings in the first detection range 360 (step S18) and sets the sizes of the parking position in the vertical and horizontal directions to the sizes that correspond to the sizes of the tentative parking space 310. Then, the parking assistance device 100 calculates the parking route that reaches the set parking position (step S19) and outputs information of the calculated parking route to the vehicle control unit 90. Step S18 corresponds to "parking position setting step" of the present invention.

In a case where the bearings of the obstacles are not detected in the divided ranges 361 to 368 included in the first detection range 360 (step S15: NO), the parking assistance device 100 calculates the average value of the bearings of the obstacle in the divided ranges 371 to 378 included in the second detection range 370 as the bearing of the obstacle in the second detection range 370. Similarly, the parking assistance device 100 calculates the average value of the bearings of the obstacle in the divided ranges 381 to 388 included in the third detection range 380 as the bearing of the obstacle in the third detection range 380. Then, the parking assistance device 100 calculates the average value of the detected bearing of the obstacle in the second detection range 370 and the detected bearing of the obstacle in the third detection range 380 (step S17). The parking assistance device 100 sets the parking position based on the tentative parking space 310 and the calculated average value of the bearings in the second detection range 370 and the third detection range 380. That is, the parking assistance device 100 sets the bearing of the parking position to the average value of the bearings in the second detection range 370 and the third detection range 380 (step S18) and sets the sizes of the parking position in the vertical and horizontal directions to the sizes that correspond to the sizes of the tentative parking space 310. Then, the parking assistance device 100 calculates the parking route that reaches the set parking position (step S19) and outputs the information of the calculated parking route to the vehicle control unit 90. Step S18 corresponds to "parking position setting step" of the present invention.

As described above, the parking assistance device 100 of this embodiment includes the parking region detection unit 133, the parking direction specification unit 134, the obstacle detection unit 132, the detection range setting unit 136, the division unit 137, the bearing calculation unit 138, and the parking position setting unit 139.

The parking region detection unit 133 detects the parking region 300 at which the subject vehicle 5 on which the parking assistance device 100 is mounted is capable of being parked.

The parking direction specification unit 134 specifies the parking direction in a case where the subject vehicle 5 is parked at the parking region 300.

The obstacle detection unit 132 detects an obstacle present around the subject vehicle 5.

The detection range setting unit 136 sets a region that includes the parking region 300 and a region which neighbors the parking region 300 as the detection range 350 for detecting the bearing of an obstacle.

The division unit 137 divides the detection range 350 in the direction associated with the parking direction specified by the parking direction specification unit 134 and thereby generates plural divided ranges 361 to 368, 371 to 378, and 381 to 388.

The bearing calculation unit 138 calculates the bearing of the obstacle detected by the obstacle detection unit 132, which is the bearing of a side surface of the obstacle which extends in the parking direction, for each of the divided ranges 361 to 368, 371 to 378, and 381 to 388. The bearing calculation unit 138 calculates the average values of the bearings of the obstacles that are respectively calculated in the divided ranges 361 to 368, 371 to 378, and 381 to 388.

The parking position setting unit 139 sets the parking position based on the average value of the bearings of the obstacle in a case where the subject vehicle 5 is parked at the parking region 300.

Consequently, in this embodiment, the bearing of the parking position may be set to the average values of the bearings of the obstacles that are respectively calculated in the divided ranges 361 to 368, 371 to 378, and 381 to 388. For example, in a case where the other vehicle 7 is detected as an obstacle, the bearing in a case where the subject vehicle 5 is parked may be set to the average value of the respective bearings of the side surface of the other vehicle 7 in the divided ranges. Thus, the subject vehicle 5 may be parked in accordance with the bearing of the other vehicle 7.

The detection range 350 includes the first detection range 360 that includes the parking region 300 and the second detection range 370 and the third detection range 380 that neighbor the first detection range 360.

The division unit 137 respectively divides the first detection range 360, the second detection range 370, and the third detection range 380 into plural portions and generates the divided ranges 361 to 368, 371 to 378, and 381 to 388.

The bearing calculation unit 138 calculates the average value of the bearings of the obstacle for each of the detection ranges, which are the first detection range 360, the second detection range 370, and the third detection range 380. In a case where the bearings of the obstacle are calculated in the divided ranges 361 to 368 resulting from division of the first detection range 360, the bearing calculation unit 138 outputs the average value of the calculated bearings of the obstacle in the divided ranges 361 to 368 as the bearing.

Consequently, in a case where an obstacle is detected in the first detection range 360 that includes the parking region, the bearing of the subject vehicle 5 in the parking position may be caused to match the bearing of the obstacle detected in the first detection range 360. Because an obstacle detected in the first detection range 360 that includes the parking region 300 is a guard rail, a curb, a fence, or the like, the subject vehicle 5 may be parked along the extending direction of such an obstacle.

In a case where the bearings of the obstacle are not calculated in the divided ranges 361 to 368 resulting from division of the first detection range 360, the bearing calculation unit 138 respectively calculates the average value of the bearings of the obstacle, which are calculated in the divided ranges 371 to 378 resulting from division of the second detection range 370, and the average value of the bearings of the obstacle, which are calculated in the divided ranges 381 to 388 resulting from division of the third detection range 380.

The bearing calculation unit 138 outputs the average value of the calculated average value of the bearings of the obstacle in the second detection range 370 and the calculated average value of the bearings of the obstacle in the third detection range 380 as the bearing.

Consequently, in a case where an obstacle is not detected in the first detection range 360 that includes the parking region, the bearing of the subject vehicle 5 in the parking position may be set to the average value of the bearings of the obstacles detected in the second detection range 370 and the third detection range 380. Thus, the bearing of the subject vehicle 5 in the parking position may be caused to match the bearings of the other vehicles 7 that are parked at regions neighboring the parking region 300.

The parking assistance device 100 includes the tentative parking space setting unit 135 that sets the tentative parking space 310 for parking the subject vehicle 5 in the parking region 300. The bearing calculation unit 138 obtains the bearing of the tentative parking space 310 set by the tentative parking space setting unit 135. The bearing calculation unit 138 excludes the bearings, whose differences from the bearing of the tentative parking space 310 are the threshold value set in advance or greater, from the bearings of the obstacles that are respectively calculated for the divided ranges 361 to 368, 371 to 378, and 381 to 388 and calculates the bearing of the obstacle for each of the detection ranges, which are the first detection range 360, the second detection range 370, and the third detection range 380.

Consequently, the bearings, whose differences from the bearing of the tentative parking space 310 are the threshold value set in advance or greater, may be excluded from the bearings of the obstacles that are respectively calculated for the divided ranges 361 to 368, 371 to 378, and 381 to 388. Thus, detection precision of the bearings of the obstacles in the first detection range 360, the second detection range 370, and the third detection range 380 may be enhanced.

In a case where the parking direction specified by the parking direction specification unit 134 is a direction in parallel with the direction of the front-rear axis 8 of the subject vehicle 5, the division unit 137 divides the detection ranges in a direction orthogonal to the direction of the front-rear axis 8 as the direction associated with the parking direction.

In a case where the parking direction specified by the parking direction specification unit 134 is a direction in parallel with the width direction 9 of the vehicle, the division unit 137 divides the first detection range 360, the second detection range 370, and the third detection range 380 in a direction orthogonal to the width direction 9 as the direction associated with the parking direction.

Consequently, in a case where the subject vehicle 5 is parked at the parking region 300 in the parking direction, the first detection range 360, the second detection range 370, and the third detection range 380 may be divided in the optimal direction in which the bearing of an obstacle is detectable.

The above-described embodiment merely represents one aspect of the present invention as an example, and any modification and application are possible without departing from the scope of the gist of the present invention.

For example, FIG. 1 illustrates the sonars 15a to 15f as the sensors included in the sensor unit 10 as examples, but the sensor is not limited to the sonar. The sensor may be a millimeter-wave radar or light detection and ranging or laser imaging detection and ranging (LIDAR), for example.

FIG. 1 is a schematic diagram that illustrates a configuration of the parking assistance device 100 by categorizing that in accordance with principal processing contents for easy understanding of the invention of the application, and the configuration of the parking assistance device 100 may be categorized into more configuration elements in accordance with processing contents. Categorization may be made such that one configuration element executes more pieces of processing.

In a case where a control method of the parking assistance device of the present invention is realized by using a computer, a program to be executed by the computer may be configured in a form of a recording medium or of a transmission medium that transmits the program. As a recording medium, a magnetic or optical recording medium or a semiconductor memory device may be used. Specifically, portable or fixed recording media such as a flexible disk, a hard disk drive (HDD), a compact disk read-only memory (CD-ROM), a DVD, a Blu-ray(R) disk, a magneto-optical disk, a flash memory, and a card recoding medium may be raised. The above recording medium may be a non-volatile storage device such as a RAM, a ROM, or an HDD, which is included in the parking assistance device 100.

For example, processing units in the flowchart illustrated in FIG. 14 are divided in accordance with principal processing contents for easy understanding of processing by the parking assistance device 100, and the present invention is not limited by manners of division or names of processing units. The processing by the parking assistance device 100 may be divided into more processing units in accordance with processing contents. Division may be made such that one processing unit of the processing by the parking assistance device 100 includes more pieces of processing.

REFERENCE SIGNS LIST 1 in-vehicle device
5 subject vehicle
7 other vehicle
7A other vehicle
7B other vehicle
8 front-rear axis
9 width direction
10 sensor unit
15a to 15f sonar
30 image-capturing unit
31 front camera
33 left side camera
35 right side camera
37 rear camera
50 navigation device
70 storage unit
75 map data
90 vehicle control unit
100 parking assistance device
110 memory
115 control program
130 processor
131 image processing unit
132 obstacle detection unit
133 parking region detection unit
134 parking direction specification unit
135 tentative parking space setting unit
136 detection range setting unit
137 division unit
138 bearing calculation unit
139 parking position setting unit
140 parking route calculation unit
200 map
210 data
300 parking region
310 tentative parking space
350 detection range
360 first detection range
361 to 368 divided range
370 second detection range
371 to 378 divided range
380 third detection range
381 to 388 divided range

What is claimed is:

1. A parking assistance device comprising:
a processor, wherein the processor:
detects a parking region at which a vehicle on which the parking assistance device is mounted is capable of being parked;
specifies a parking direction in a case where the vehicle is parked at the parking region;
detects an obstacle present around the vehicle;
sets a region which includes the parking region and a region which neighbors the parking region, as a detection range for detecting a bearing of the obstacle;
divides the detection range in a direction which is associated with the parking direction specified by the parking direction specification unit and generates plural divided ranges;
calculates a bearing of the obstacle, which is a bearing of a side surface of the obstacle which extends in the parking direction, for each of the divided ranges and calculates an average value of the bearings of the obstacle which are respectively calculated for the divided ranges; and
sets a parking position in a case where the vehicle is parked at the parking region, based on the average value of the bearings,
wherein the detection range includes a first detection range that includes the parking region and a second detection range and a third detection range that neighbor the first detection range,
the processor divides each of the first detection range, the second detection range, and the third detection range into plural portions and generates the divided ranges,
calculates an average value of bearings of the obstacle for each of the detection ranges, which are the first detection range, the second detection range, and the third detection range, and
outputs the average value of the bearings of the obstacle in the first detection range in a case where the bearings of the obstacle are calculated in the divided ranges resulting from division of the first detection range.

2. The parking assistance device according to claim 1, wherein
in a case where the bearings of the obstacle are not calculated in the divided ranges resulting from division of the first detection range, the processor respectively calculates the average value of the bearings of the obstacle, which are calculated in the divided ranges resulting from division of the second detection range, and the average value of the bearings of the obstacle, which are calculated in the divided ranges resulting from division of the third detection range, and outputs an average value of the calculated average value of the bearings of the obstacle in the second detection range and the calculated average value of the bearings of the obstacle in the third detection range.

3. The parking assistance device according to claim 1, wherein the processor
sets a tentative parking space for parking the vehicle in the parking region, wherein
obtains a bearing of the tentative parking space,
excludes the bearings, whose differences from the bearing of the tentative parking space are a threshold value set in advance or greater, from the bearings of the obstacle that are respectively calculated for the divided ranges, and calculates the bearing of the obstacle for each of the detection ranges, which are the first detection range, the second detection range, and the third detection range.

4. The parking assistance device according to claim 1, wherein
the processor
divides the detection range in a direction orthogonal to a front-rear axis direction of the vehicle as the direction associated with the parking direction in a case where the parking direction is a direction in parallel with the front-rear axis direction of the vehicle, and
divides the detection range in a direction orthogonal to a width direction of the vehicle as the direction associated with the parking direction in a case where the parking direction is a direction in parallel with the width direction of the vehicle.

5. A control method of a parking assistance device, the method comprising:
a parking region detection step of detecting a parking region at which a vehicle on which the parking assistance device is mounted is capable of being parked;
a parking direction specification step of specifying a parking direction in a case where the vehicle is parked at the parking region;
an obstacle detection step of detecting an obstacle present around the vehicle;
a detection range setting step of setting a region that includes the parking region and a region which neighbors the parking region, as a detection range for detecting a bearing of the obstacle;
a division step of dividing the detection range in a direction which is associated with the parking direction specified by the parking direction specification step and generating plural divided ranges;
a bearing calculation step of calculating a bearing of the obstacle detected by the obstacle detection step, which is a bearing of a side surface of the obstacle which extends in the parking direction, for each of the divided ranges and calculating an average value of the bearings of the obstacle which are respectively calculated for the divided ranges; and
a parking position setting step of setting a parking position in a case where the vehicle is parked at the parking region based on the average value of the bearings which is calculated by the bearing calculation step,
wherein the detection range includes a first detection range that includes the parking region and a second detection range and a third detection range that neighbor the first detection range, in the division step, each of the first detection range, the second detection range, and the third detection range is divided into plural portions, and the divided ranges are generated,
in the bearing calculation step, an average value of bearings of the obstacle is calculated for each of the detection ranges, which are the first detection range, the second detection range, and the third detection range, and
the average value of the bearings of the obstacle in the first detection range is output in a case where the bearings of the obstacle are calculated in the divided ranges resulting from division of the first detection range.

6. The control method of a parking assistance device according to claim 5, wherein
in the bearing calculation step, in a case where the bearings of the obstacle are not calculated in the divided ranges resulting from division of the first detection range, the average value of the bearings of the obstacle, which are calculated in the divided ranges resulting from division of the second detection range, and the average value of the bearings of the obstacle, which are calculated in the divided ranges resulting from division of the third detection range are respectively calculated, and
an average value of the calculated average value of the bearings of the obstacle in the second detection range and the calculated average value of the bearings of the obstacle in the third detection range is output.

7. The control method of a parking assistance device according to claim 5, further comprising
a tentative parking space setting step of setting a tentative parking space for parking the vehicle in the parking region, wherein
in the bearing calculation step, a bearing of the tentative parking space set by the tentative parking space setting step is obtained, and
the bearings, whose differences from the bearing of the tentative parking space are a threshold value set in advance or greater, are excluded from the bearings of the obstacle that are respectively calculated for the divided ranges, and the bearing of the obstacle is calculated for each of the detection ranges, which are the first detection range, the second detection range, and the third detection range.

8. The control method of a parking assistance device according to claim 5, wherein
in the division step,
the detection range is divided in a direction orthogonal to a front-rear axis direction of the vehicle as the direction associated with the parking direction in a case where the parking direction specified by the parking direction specification step is a direction in parallel with the front-rear axis direction of the vehicle, and
the detection range is divided in a direction orthogonal to a width direction of the vehicle as the direction associated with the parking direction in a case where the parking direction specified by the parking direction specification step is a direction in parallel with the width direction of the vehicle.

* * * * *